United States Patent [19]

Yamazaki et al.

[11] 4,258,392

[45] Mar. 24, 1981

[54] CODING METHOD FOR FACSIMILE SIGNAL

[75] Inventors: Yasuhiro Yamazaki, Hiratsuka; Yasushi Wakahara, Tokyo; Kiyohiro Yuuki; Toyomichi Yamada, both of Yokosuka, all of Japan

[73] Assignees: Kokusai Denshin Denwa Kabushiki Kaisha; Nippon Telegraph and Telephone Public Corporation, both of Tokyo, Japan

[21] Appl. No.: 95,927

[22] Filed: Nov. 19, 1979

[30] Foreign Application Priority Data

Nov. 22, 1978 [JP] Japan .................. 53-144594
Jan. 24, 1979 [JP] Japan .................. 54-6030

[51] Int. Cl.³ .................. H04N 1/40; H04N 7/12
[52] U.S. Cl. .................. 358/260; 358/261; 340/347 DD
[58] Field of Search .................. 358/256, 260, 261; 347/347 DD; 364/515

[56] References Cited

U.S. PATENT DOCUMENTS

| | | |
|---|---|---|
| 3,927,251 | 12/1975 | White et al. .................. 358/261 |
| 4,040,093 | 8/1977 | Nakagome et al. .................. 358/261 |
| 4,115,815 | 9/1978 | Nakagome et al. .................. 358/261 |
| 4,117,517 | 9/1978 | Shimtani et al. .................. 358/261 |
| 4,121,258 | 10/1978 | Nakagome et al. .................. 358/261 |
| 4,134,133 | 1/1979 | Teramura et al. .................. 358/260 |

Primary Examiner—Robert L. Griffin
Assistant Examiner—Edward L. Coles
Attorney, Agent, or Firm—Robert E. Burns; Emmanuel J. Lobato; Bruce L. Adams

[57] ABSTRACT

A coding method for a two-level facsimile signal by the use of the two-dimensional coding principle, in which when successively coding addresses of a facsimile signal representative of the positions of information change picture elements, each having a binary level different from that of an immediately preceding picutre element, the above-mentioned addresses on each coding scanning line are classified into three modes that are determined by the states of information change picture elements on the coding scanning line and on a reference scanning line immediately preceding the coding scanning line. The above two-dimensinal coding principle and a one-dimensional coding principle may be adaptively adopted to shorten the transmission time and to lessen the influence of a transmission error.

8 Claims, 27 Drawing Figures

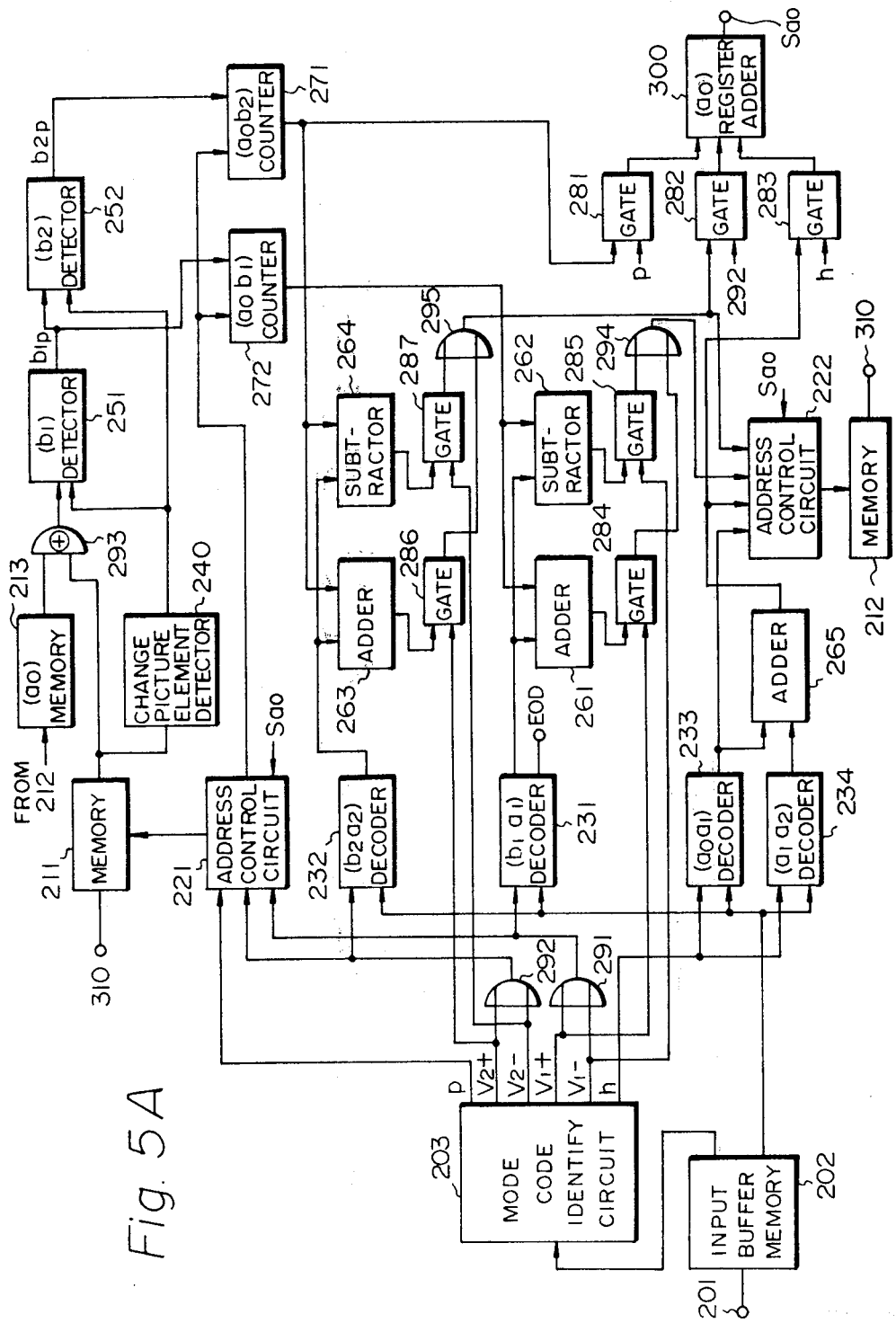

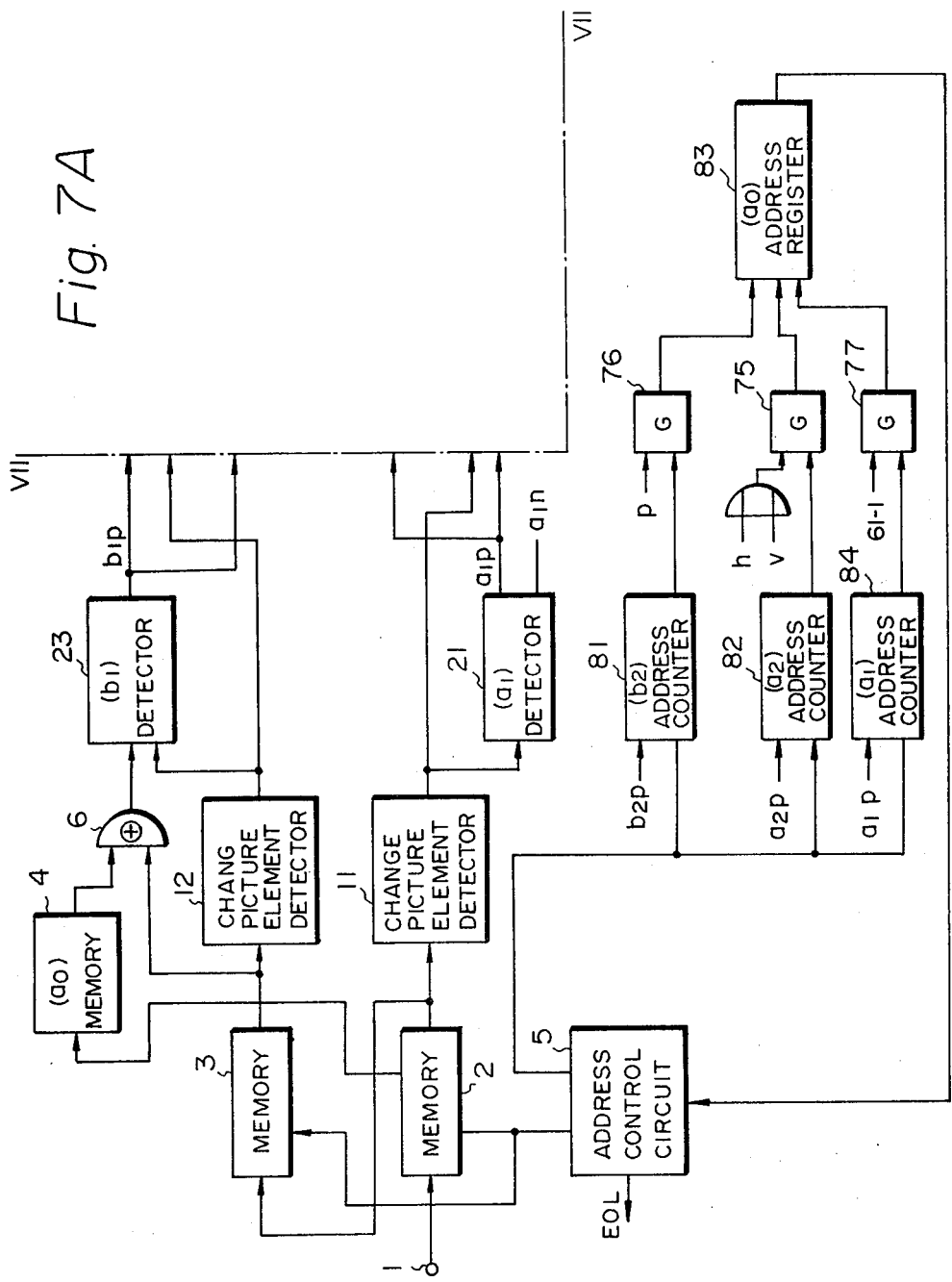

CODING METHOD FOR FACSIMILE SIGNAL

BACKGROUND OF THE INVENTION

This invention relates to a coding method for efficient transmission or storage of a binary signal, such as a two-level facsimile signal.

Heretofore, there have been proposed, as two-level facsimile signal coding systems, (1) a run-length coding system in which a signal obtained by scanning is converted into a time series train and then the magnitudes of the run lengths of white and black are successively coded alternately with each other for transmission and (2) a system in which signals of plural, for example, two scanning lines are simultaneously coded all together. The system (1) does not utilize at all the property that facsimile signals have a high correlation in a direction perpendicular (vertical) to the scanning line direction; therefore, the compression efficiency is low. The system (2) makes use of the correlation in the vertical direction with respect to the signals of several scanning lines to be coded at a time but does not utilize the correlation to signals of other scanning lines; consequently, the compression effect is higher than that in the case of the system (1) but not sufficient.

SUMMARY OF THE INVENTION

The present inventors have proposed various two-dimensional successive coding systems which obviate such defects of the prior art systems and removes redundancy of a facsimile signal by a relatively small number of memories and a simple circuit or means to thereby permit a substantial reduction of the amount of codes or the number of bits to be sent out.

An object of the present invention is to provide a two-dimensional successive coding method in which the amount of information or signals to be transmitted is much more decreased, thereby to permit the reduction of the transmission time and the number of memories for storing or processing information.

Another object of this inventin is to provide a coding method for a facsimile signal using a one-dimensional, two-dimensional adaptive coding method in which the two-dimensional successive coding principle and the one-dimensional coding principle, such as a run-length coding method, are adaptively adopted, so that the amount of information or signals to be transmitted is reduced, thereby to shorten the transmission time and to lessen the influence of a transmission error.

In the present invention relating to the first object, when successively coding the positions (hereinafter referred to as addresses) of information change picture elements (hereinafter referred to simply as change picture elements) of a facsimile signal, each having a binary signal level different from that of an immediately preceding picture elements, the number of picture elements (hereinafter referred to as a distance) between each change picture element to be coded and a selected one of the adjoining change picture elements on the same scanning line (hereinafter referred to as a coding line) as the change picture element to be coded or on a scanning line immediately preceding it (which scanning line will hereinafter be referred as a reference line) is employed to be classified into three modes determined by the combinations of states of the above information change picture elements.

The present invention (relating to the second object) is based on the principle that in the coding of a digital facsimile signal, picture signal information of each line is coded by the one-dimensional system (for example, a run-length coding system) and the two-dimensional system and, for each line, the two coded signals are compared with each other, for example, in the number of coded bits and a favorable one of them is selected as a coded output. Let [one-dimensional] and [two-dimensional] represent the numbers of coded bits obtained by coding a coding line by the one-dimensional and the two-dimensional coding system, respectively. When [one-dimensional] > [two-dimensional], the two-dimensional coding is used as a result of a judgement that the amount of information by the one-dimensional coding is larger than that of by the two-dimensional coding, whereas when [one-dimensional] ≦ [two-dimensional], the one dimensional coding is employed for the line to be coded as a result of a judgement that the amount of information by the one-dimensional coding is smaller than that by the two-dimensional coding.

BRIEF DESCRIPTION OF THE DRAWING

This invention will be described in details hereinafter with reference to the accompanying drawings, in which:

FIGS. 4A, 7A and 7B illustrate independently or jointly in block form embodiments of this invention;

FIGS. 5A and 8A show in block form examples of decoding apparatus for facsimile signals encoded by the embodiments of FIGS. 4A, 7A and 7B;

DESCRIPTION OF THE PREFERRED EMBODIMENTS

Figure 1:
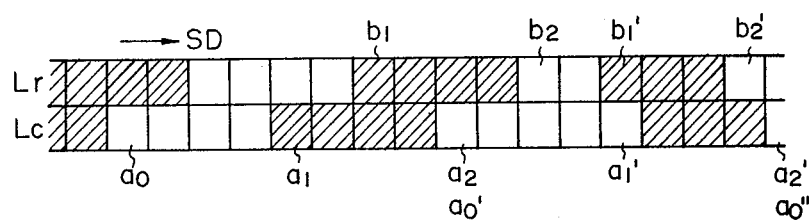
FIGS. 1, 2, 3A and 3B, 6A, 6B, 6C, 6D, 9 and 14 show examples of facsimile signals explanatory of the principles of this invention.
Figure 2:
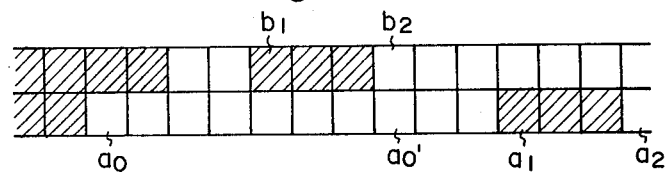

A detailed description will be given of specific operative examples of this invention.

FIGS. 1, 2, 3A and 3B illustrate examples of facsimile signals, blank blocks representing white picture elements and hatched blocks black picture elements.

At first, a coding start picture element $a_0$ and the other change picture elements are defined as follows:

$a_0$: a starting picture element on the coding line $L_c$ with which the coding starts along the scanning direction SD;

$a_1$: a change picture element next to $a_0$ on the coding line;

$a_2$: a change picture element next to $a_1$ on the coding line;

$b_1$: a first change picture element on the reference line $L_r$ occurring after the picture element just above $a_0$ and having a binary signal level different from that of $a_0$;

$b_2$: a change picture element next to $b_1$ on the reference line.

As will hereinbelow be described, the picture elements on the coding line and the reference line are successively collated with each other to detect the change picture elements on the both scanning lines for coding.

(Procedure 1): In a case where the two change picture elements $b_1$ and $b_2$ on the reference line are detected prior to the change picture element $a_1$ on the coding line (refer to FIG. 2), this state is defined as a first mode (hereinafter referred to as the Pass mode), and a distance $b_1b_2$ is coded with a Pass mode code, for example, "1110" (refer to the column of the Pass mode in Table 1), by which a starting picture element for the next coding is set at a picture element $a'_0$ on the coding line just under the picture element $b_2$.

(Procedure 2): In a case where the change picture element $a_1$ is detected on the coding line prior to the change picture element $b_2$ on the reference line (refer to FIGS. 3A, 3B), coding of distances $a_0a_1$ and $a_1a_2$ is defined as a second mode (hereinafter referred to as the Horizontal mode), and this coding is achieved in accordance with Table 1(a), and then the number of bits $[a_0a_1]+[a_1a_2]$ which is obtained by adding a mode code "1111" to the coded value is prepared. In Table 1(a), $MH(a_0a_1)$ and $MH(a_1a_2)$ are values represented by $MH(xy)$ in Table 1(b), x and y respectively representing the front and the back picture elements in the parentheses. At the same time, coding of distances $b_1a_1$ and $b_2a_2$ is defined as a third mode (hereinafter referred to as the Vertical mode), and the coding is provisionally effected in accordance with Table 1(a) to obtain a bit number $[b_1a_1]+[b_2a_2]$. In this case, $D(n)$ is defined as shown in Table 1(c) following the value n in the parenthesis.

TABLE 1

| Mode | Elements to be coded | Code |
|---|---|---|
| Pass mode | $b_1b_2$ | 1110 |
| Horizontal mode | $a_0a_1, a_1a_2$ | 1111 + $MH(a_0a_1)$ + $MH(a_1a_2)$ |
| | $b_1a_1 = 0$ | 0 |
| | $b_1a_1 = +1$ | 100 |
| Vertical mode | $b_1a_1 \geq 2^{-1}$ | 1100 + $D(b_1a_1 - 1)$ |
| | $b_1a_1 \leq -2$ | 1101 + $D(|b_1a_1| - 1)$ |

(a)

| xy | MH(xy) x : white | MH(xy) x : black | n | D(n) |
|---|---|---|---|---|
| 0 | 00110101 | 0000110111 | 1 | 1 |
| 1 | 000111 | 010 | 2 | 01 |
| 2 | 0111 | 11 | 3 | 001 |
| 3 | 1000 | 10 | 4 | 0001 |
| 4 | 1011 | 011 | 5 | 00001 |
| : | : | : | : | : |
| (b) | | | (c) | |

In the colum of the "Vertical mode" in Table 1, "—" indicates the case of the picture element $a_1$ being detected before the picture element $b_1$ (or $a_2$ being detected before $b_2$), and "+" the case of picture element $a_1$ being detected after the picture element $b_1$ (or $a_2$ being detected after $b_2$).

Next, the coded bit numbers $[a_0a_1]+[a_1a_2]$ and $[b_1a_1]+[b_2a_2]$ thus obtained are compared with each other to select any one of coding modes in accordance with the following conditions:

$$[a_0a_1]+[a_1a_2] \geq [b_1a_1]+[b_2a_2] \quad (a)$$

In a case where this conditions is established, it is judged that high correlation exists, respectively, between the change picture elements $a_1$ and $a_2$ to be coded and reference picture elements $b_1$ and $b_2$, and the distances $b_1a_1$ and $b_2a_2$ are coded in the Vertical mode; thereafter a new starting picture element is shifted to the position of the picture element $a_1$.

Figure 3A:
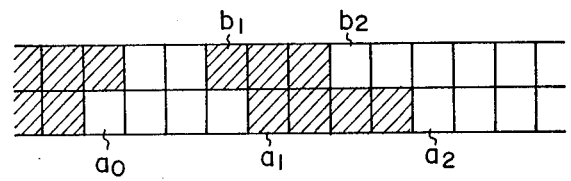

For example, in the case of FIG. 3A.

$[a_0a_1] = 11111011 = 8$ bits $[a_1a_2] = 011 = 3$ bits $[b_1a_1] = 100 = 3$ bits $[b_2a_2] = 11001 = 5$ bits As a consequence, the condition $[a_0a_1]+[a_1a_2] \geq [b_1a_1]+[b_2a_2]$ is established, and a coded signal of the picture elements $a_1$ and $a_2$ becomes "10011001".

$$[a_0a_1]+[a_1a_2] < [b_1a_1]+[b_2a_2] \quad (b)$$

When this condition is set up, it is judged that high correlation exists, respectively, between the change picture elements $a_1$ and $a_2$ to be coded and the starting picture element $a_0$ and the change picture element $a_1$, and it is determined to perform coding in the second mode, that is, in the Horizontal mode; and coding of distances $a_0a_1$ and $a_1a_2$ is achieved following the Horizontal mode code "1111", shifting a new starting picture element to the position of the picture element $a_2$.

Figure 3B:
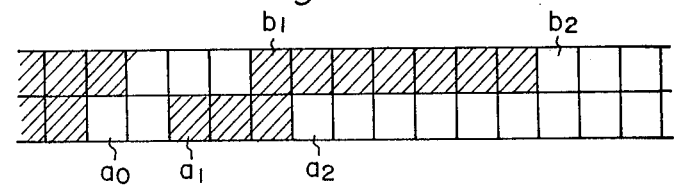

For example, in the case of FIG. 3B, $[a_0a_1] = 11110111 = 8$ bits $[a_1a_2] = 10 = 2$ bits $[b_1a_1] = 11011 = 5$ bits $[b_1a_2] = 110100001 = 9$ bits As a result, the condition $[a_0a_1]+[a_1a_2] < [b_1a_1]+[b_2a_2]$ is established, and the coded outputs of the picture elements $a_1$ and $a_2$ become "11110111" and "10" respectively.

In the above description, the expressions (a) and (b) are mentioned as the conditions for selecting the Horizontal mode and the Vertical mode, but other conditional expressions can be used such as follows:

$$[a_0a_1]+[a_1a_2] \geq [b_1a_1]+[b_2a_2]+m \quad (c)$$

$$[a_0a_1]+[a_1a_2] < [b_1a_1]+[b_2a_2]+m \quad (d)$$

(m being an integer)

Alternatively, if use is made of the distances $a_0a_1$, $a_1a_2$ and $b_1a_1$, $b_2a_2$ before coding, $$(a_0a_1+a_1a_2) \geq (b_1a_1+b_2a_2)+m \quad (e)$$

$$(a_0a_1+a_1a_2) < (b_1a_1+b_2a_2)+m \quad (f)$$

(m being an integer)

Moreover, in the column of codes in Table 1, an MH code (a modified Huffmann code, for particulars, refer to CCITT Draft Recommendation T. 4) and a bit-by-bit code D(n) are used; but it is a matter of course that the present invention is not limited specifically to the use of such codes and can be achieved with ordinary variable length codes.

Besides, in (procedure 1), it is conditioned that the change picture elements just above the picture elements $a_0$ and $a_1$ are not regarded as $b_1$ and $b_2$; but the condition can be modified such that the change picture element just above the picture element $a_0$ or $a_1$ is included in $b_1$ and $b_2$, or that the change picture elements are not regarded as $b_1$ and $b_2$ unless they are not spaced by more than n (n being an integer) picture elements apart from the picture elements $a_0$ and $a_1$.

As described in detail above, in the present invention, addresses of change picture elements to be coded are successively coded in pairs, and in this case, the addresses are each coded using a relative distance between the change picture element to be coded and a selected one of the change picture elements already coded on the coding line or the reference line.

A brief description will be made of an example of boundary conditions which are utilized when carrying this invention into practice, although it does not define the essence of the invention.

(1) Coding of a starting picture element on each scanning line:

A change picture element from white to black is always used as the first change picture element on each line to be coded. Accordingly, in a case of the first picture element being black, it is made the first change picture element, or the first picture element is compulsorily made white.

Further, the first starting picture element $a_0$ on each coding line is set up at the position of the first picture element.

(2) Coding of a terminating picture element on each scanning line:

The terminating picture element (In CCITT Recommendation T. 4, one line consists of 1728 picture elements.) of each line is coded on the assumption that it is followed by a change picture element.

The following will describe examples of circuits for carrying this invention into practice in accordance with the principles described above.

Figure 4A:
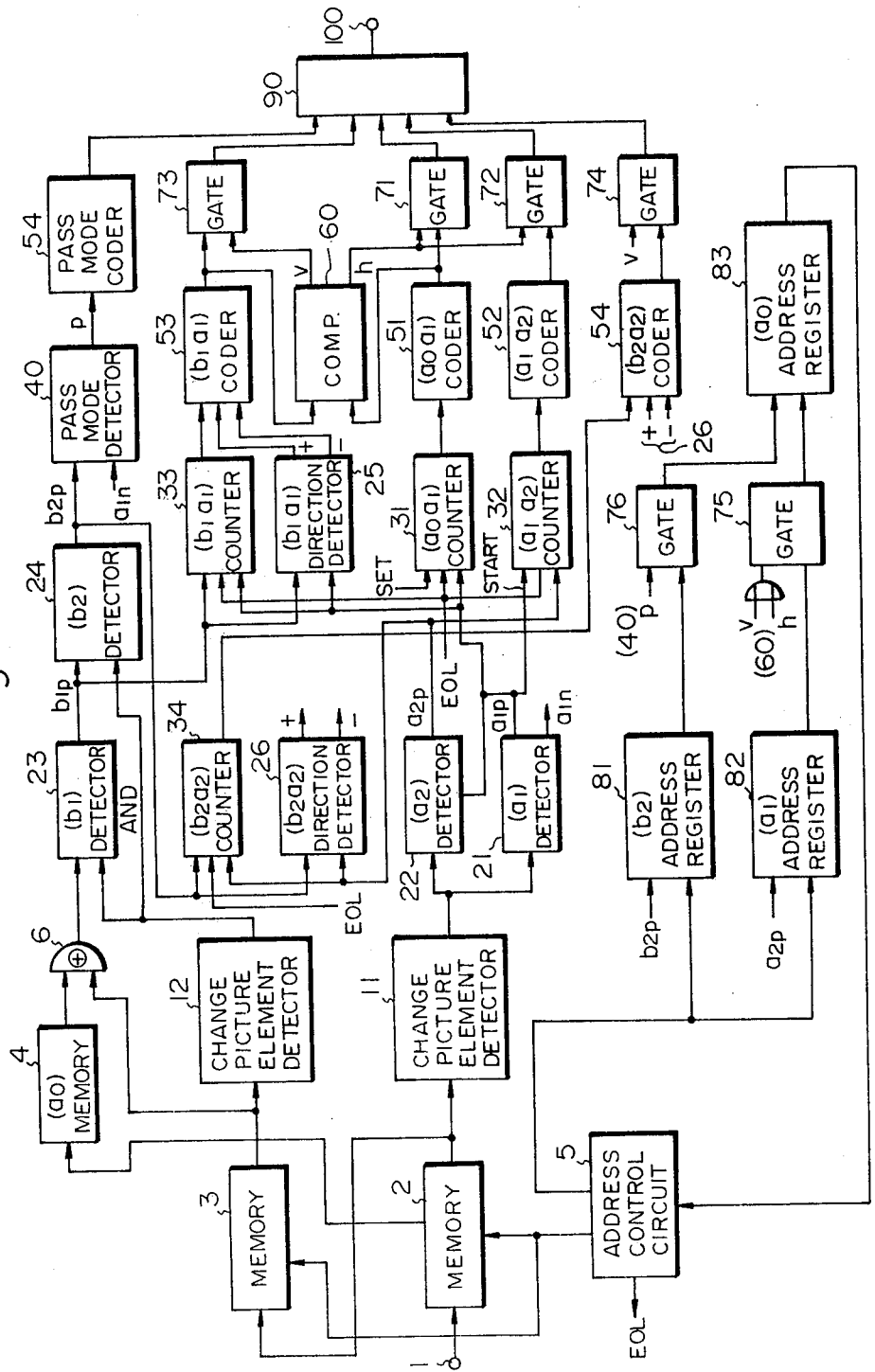

FIG. 4A illustrates an example of a coding apparatus. Reference numeral 1 indicates an input terminal for a sampled facsimile signal; 2 and 3 designate line memories, each storing signals of one line; 4 identifies a memory for storing the level of starting picture element; 5 denotes an address control circuit for controlling addresses of memories 2 and 3 and for generating an end of line signal EOL; 6 represents an exclusive OR (EOR) circuit; 7 shows an OR circuit; 11 and 12 refers to detectors for change picture element of the coding line and the reference line respectively; 21, 22, 23 and 24 indicate detectors for detecting the change picture elements $a_1$, $a_2$, $b_1$ and $b_2$ respectively; 25 and 26 designate $b_1a_1$ and $b_2a_2$ direction detector 31, 32, 33 and 34 identify counters; 40 denotes a Pass mode detector; 51, 52, 53, 54 and 55 represent coders; 60 shows a comparator for comparing the numbers of coded bits with each other; 71, 72, 73, 74, 75 and 76 refer to gates; 81 and 82 indicate address counters; 83 identifies an $a_0$ address register; 90 designates a signal combiner; and 100 identifies an output terminal.

For the sake of brevity, a memory shift pulse generator, a counter clock pulse generator, etc. are not shown; but these do not exert influence on an understanding of the essence of the operation of the present invention.

Next, the construction and operation of this embodiment will be described in more detail.

A facsimile signal to be coded is provided line by line from the input terminal 1 to the coding line memory 2 for storage therein. At this time, as a signal of a reference line, a signal of the preceding line stored in the coding line memory 2 is transferred to the reference line memory 3 for storage therein. The $a_0$ memory 4 has stored therein information of the starting picture element $a_0$.

Reading of the coding line memory 2 and the reference line memory 3 simultaneously starts from the position of the starting picture element $a_0$ under the control of the address control circuit 5. The signal read from the coding line memory 2 bit by bit is applied to the picture element detector 11.

Figure 4B:
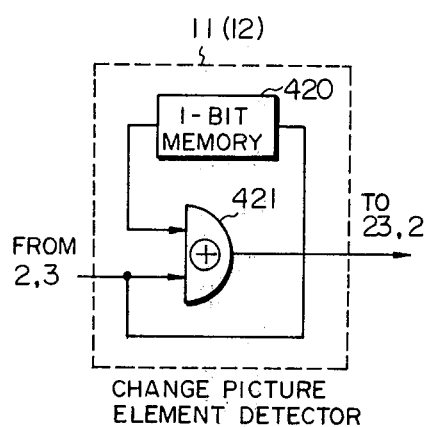
FIGS. 4B, 4C and 4D illustrate in block form specific operative examples of circuits for use in the embodiments of FIGS. 4A, 7A and 7B.

The change picture element detector 11 comprises an exclusive OR circuit 421 and a 1-bit memory 420, as shown in FIG. 4B, and compares the picture element signal read out of the line memory 2 with an immediately preceding picture element signal to provide an output "1" to the $a_1$ detector 21 (a flip-flop) when detecting a change picture element. As a result of this, information on a line $a_{1p}$ of the $a_1$ detector 21 changes from "0" to "1", and information on a line $a_{1n}$ changes from "1" to "0".

The $a_2$ detector 22 is a flip-flop which provides "1" on a line $a_{2p}$ when a change picture element is detected by the first change picture element detector 11 after the picture element $a_1$ is detected by the $a_1$ detector 21 ("1" on the line $a_{1p}$).

The output $a_{1p}$ from the $a_1$ detector 21 and the output $a_{2p}$ from the $a_2$ detector 22 are applied to the $a_0a_1$ and $a_1a_2$ counters 31 and 32 respectively.

The $a_0a_1$ counter 31 starts counting of pulses from the moment when the address control circuit 5 sets $a_0$ and stops the counting when receiving "1" from the output line $a_{1p}$ of the $a_1$ detector 21. (As a consequence, the number of picture elements between the picture elements $a_0$ and $a_1$ is counted.)

The $a_1a_2$ counter 32 starts counting of pulses upon detection of the picture element $a_1$ by the $a_1$ detector 21, that is, upon reception of "1" on the line $a_{1p}$, and stops the counting upon reception of the signal "1" from the line $a_{2p}$ when the picture element $a_2$ is detected by the $a_2$ detector 22. As a consequence, the counters 31 and 32 store the count values of $a_0a_1$ and $a_1a_2$ respectively, and these count values are applied to the $a_0a_1$ and $a_1a_2$ coders 51 and 52.

The coders 51 and 52 perform coding in accordance with such code tables as shown in the Horizontal mode column and the MH(xy) column of Table 1.

Next, coding of the picture element $b_1$ is carried out in the following way. The signal read from the reference line memory 3 bit by bit is applied to the picture element detector 12, wherein a change picture element is detected. On the other hand, in the exclusive OR circuit 6, it is detected whether that information differs in code from the start picture element $a_0$ in the $a_0$ memory 4; if they are different, the former is detected as $b_1$ by the $b_1$ detector 23 to change the output on its line $b_{1p}$ from "0" to "1", which is applied to the $b_1a_1$ counter 33.

After detection of the picture element $b_1$, if the picture element is similarly detected by the $b_2$ detector 24, this detected output is provided to the $b_2a_2$ counter 32.

To the $b_1a_1$ counter 33 are applied the outputs from the line $b_{1p}$ of the $b_1$ detector 23 and the line $a_{1p}$ of the $a_1$ detector 21 and starts counting of pulses from the address control circuit 5 with a signal "1" appearing first in either one of the outputs and stops the counting with "1" appearing next. The outputs from the line $b_{1p}$ of the $b_1$ detector 23 and the line $a_{1p}$ of the $a_1$ detector 21 are also provided to the $b_1a_1$ direction detector 25.

Figure 4C:
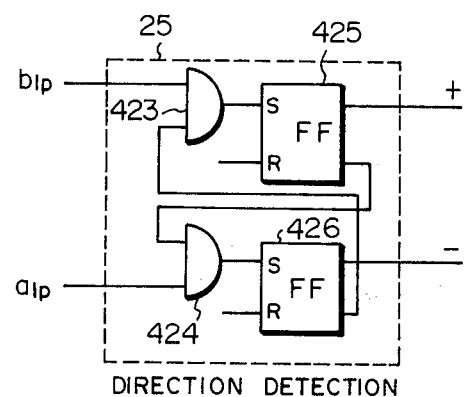

The $b_1a_1$ direction detector 25 is a circuit which comprises flip-flops 425, 426 and gates 423, 424, as shown in FIG. 4C, and which outputs "1" on a line "+" when "1" of the line $b_{1p}$ appears earlier than or simultaneously with "1" of the line $a_{1p}$ but, in the opposite case, provides an output "1" on a line "−".

The number of bits thus counted by the $b_1a_1$ counter 33 and the signals "+" and "−" detected by the $b_1a_1$ direction detector 25 are encoded by the $b_1a_1$ encoder, as shown in the column of the Vertical mode in Table 1.

Also in connection with the picture element $b_2$, the number of picture elements and the direction obtained by the $b_2a_2$ counter 34 and the $b_2a_2$ direction detector 26 are encoded by the $b_2a_2$ coder 54 in a likewise manner.

Thus, the distances $a_0a_1$, $a_1a_2$, $b_1a_1$ and $b_2a_2$ are respectively encoded by the coders 51, 52, 53 and 54 therefor, and then these encoded bit numbers are compared in magnitude by the comparator 60. In this case, in dependence on whether the condition for comparison.

$[a_0a_1]+[a_1a_2] \geqq [b_1a_1]+[b_2a_2]$ is established or not, "1" is provided on a line v (the Vertical mode) or on a line h (the Horizontal mode) at the output side of the comparator 60.

When the abovesaid condition is established to provide the Vertical mode, "1" is outputted on the line v of the comparator 60 to open the gates 73 and 74, so that the coded output signal from the $b_1a_1$ coder 53 is applied first via the gate 73 to the signal combiner 90 and then the coded output signal from the $b_2a_2$ coder 54 is applied thereto via the gate 74.

On the other hand, when the abovesaid condition is not established and the Horizontal mode is provided to yield "1" on the line h of the comparator 60, the gates 71 and 72 are opened, through which the coded output signals from the $a_0a_1$ encoder 51 and the $a_1a_2$ coder 52 are sequentially provided to the signal combiner 90.

Next, the Pass mode will be described. When the outputs from the line $b_{2p}$ of the $b_2$ detector 24 and the line $a_{1n}$ of the $a_1$ detector 21 are applied to the Pass mode detector 40 and the picture element $a_1$ is not detected ("1" on the line $a_{1n}$), if the picture element $b_2$ is detected ("1" on the line $b_{2p}$), it is judged to be the Pass mode; and "1" is outputted on an output line p of the Pass mode detector 40, and the Pass mode coder 55 generates a Pass mode code "1110" shown in Table 1 and applies it to the signal combiner 90.

The signal combiner 90 combines the coded output signals applied thereto from the Pass mode coder 55 and the gates 71, 72, 73 and 74 into a composite signal, which is provided on the output line 100 after being converted into an output signal train.

After encoding in the Pass mode, Vertical or Horizontal mode described above, it is necessary to set a new start picture element $a_0$ next. To this end, the $b_2$ address counter 81 receives pulses from the address control circuit 5 to count the number of picture elements from $a_0$ to $b_2$; furthermore, the $a_2$ address counter 82 similarly counts the number of picture elements from $a_0$ and $a_2$.

These counters 81 and 82 start counting at the moment when the address control circuit 5 starts scanning with the picture element $a_0$, and the $b_2$ address counter 81 stops the counting with the output "1" on the line $b_{2p}$ of the $b_2$ detector 24, and the $a_2$ address counter 82 stops the counting with the output "1" on the line $a_{2p}$ of the $a_2$ detector 22; but it depends on the mode which one of them is selected as the new start picture element $a_0$. That is, in a case of the Pass mode, the gate 76 is opened by the output p from the Pass mode detector 40 to pass on the output from the $b_2$ address counter 81 to the $a_0$ address register 83, and in a case of the Vertical or Horizontal mode, the gate 75 is opened by the output "1" on the line v or h of the comparator 60 via the OR circuit 7 to pass on the output from the address counter 82 to the $a_0$ address register 83. The information of the $a_0$ address register 83 is applied to the address control circuit 5 to re-start the coding operation from the new picture element $a_0$.

Figure 4D:
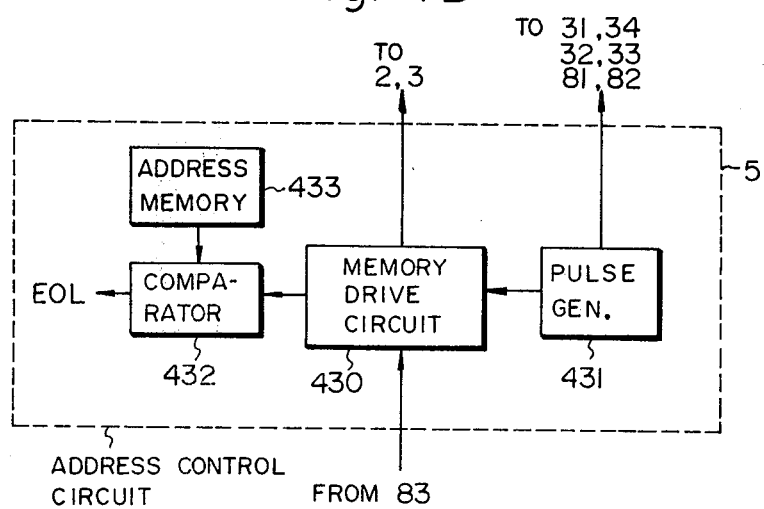

The address control circuit 5 has a construction as shown in FIG. 4D, which stores the information from the $a_0$ address register 83 in a register of a memory drive circuit 430 and increases a memory read-out address one by one upon each reception of a pulse from a pulse generator 431 to read information of the line memories 2 and 3 bit by bit from an $a_0$ address in the register of the memory drive circuit 430. Further, upon each reception of the information from the $a_0$ address register 83, the address control circuit 5 applies the information of the new starting picture element to the $a_0$ memory 4 via the coding line memory 2. The contents of the memory drive circuit 430 are compared in a comparator 432 with contents of an address memory 433 of the end picture element of one line to generate an end of line signal EOL.

The above is the coding apparatus. In the above, for the sake of brevity, the conditions for resetting the detector, registers, counters and so forth are neither described in the foregoing nor shown in the drawings; but, required ones of these circuits (the $b_1$ detector 23, the $b_2$ detector 24, the $a_1$ detector 21, the $a_2$ detector 22, the counters 81 and 82, the direction detectors 25 and 26, the counters 21, 32, 33 and 34 and so forth) are reset for each setting of the picture element $a_0$.

The interruption of the operation of this coding apparatus is placed under the control of the address control circuit 5. Namely, the $a_0$ address is always watched by the address control circuit 5, and the coding is stopped at the moment when the $a_0$ address becomes a one line terminating picture element; and the $a_0$ address is newly set to one line starting picture element, and then coding of the subsequent line is resumed.

The decoding is achieved by reversing the abovesaid steps for coding.

An example of decoding apparatus is shown in FIG. 5A. Reference numeral 201 indicates an input terminal; 202 designates an input buffer memory; 203 identifies a mode code identify circuit; 211 denotes a reference line memory; 212 represents a decoding line memory; 213 shows an $a_0$ memory; 221 and 222 refer to address control circuits; 231, 232 and 234 indicate decoders; 240 designates a change picture element detector; 251 and 252 identify a $b_1$ detector and a $b_2$ detector, respectively; 261, 263 and 265 denote adders; 262 and 264 represent subtractors; 271 and 272 show counters; 281, 282, 283, 284, 285, 286 and 287 refer to gates; 291, 292, 294 and 295 indicate OR circuits; 293 designates an exclusive OR circuit; 300 identifies an $a_0$ register; and 310 denotes an output terminal.

A coded input signal from the input terminal 201 is once stored in the buffer memory 202. The mode code identify circuit 203 has such a construction as shown in FIG. 5B, comprising registers 441, 442, 443, 444, 445, 446, 447, 448, 449, 450, 451, 452, coincidence circuits 453, 454, 455, 456, 457 and 458, a flip-flop 459 and gates 560 and 561, in which a required number of signals (four bits at most, as shown in Table 1) are read out of the input buffer memory 202 to identify the modes of operation, i.e. the Pass mode (p), the Horizontal mode (h) and the Vertical mode (v).

When the signal is "1110", it is regarded as indicating the Pass mode, and "1" is outputted on a line p and when the signal is "1111", it is regarded as indicating the Horizontal mode and "1" is provided on a line h. In the Vertical mode, if a first one-word signal is "0", "100" or "1100", it is regarded as indicating that the direction of the distance $b_1a_1$ is (+), and "1" is produced on a line $v_1+$; and if this signal is "101" or "1101", it is regarded as indicating that the direction of the distance $b_1a_1$ is (−), and "1" is yielded on a line $v_1-$.

The same is true of a second word, but in this case, a signal "1" is provided on a line $v_2+$ or $v_2-$ in accordance with the direction of the distance $b_2a_2$.

Figure 5B:
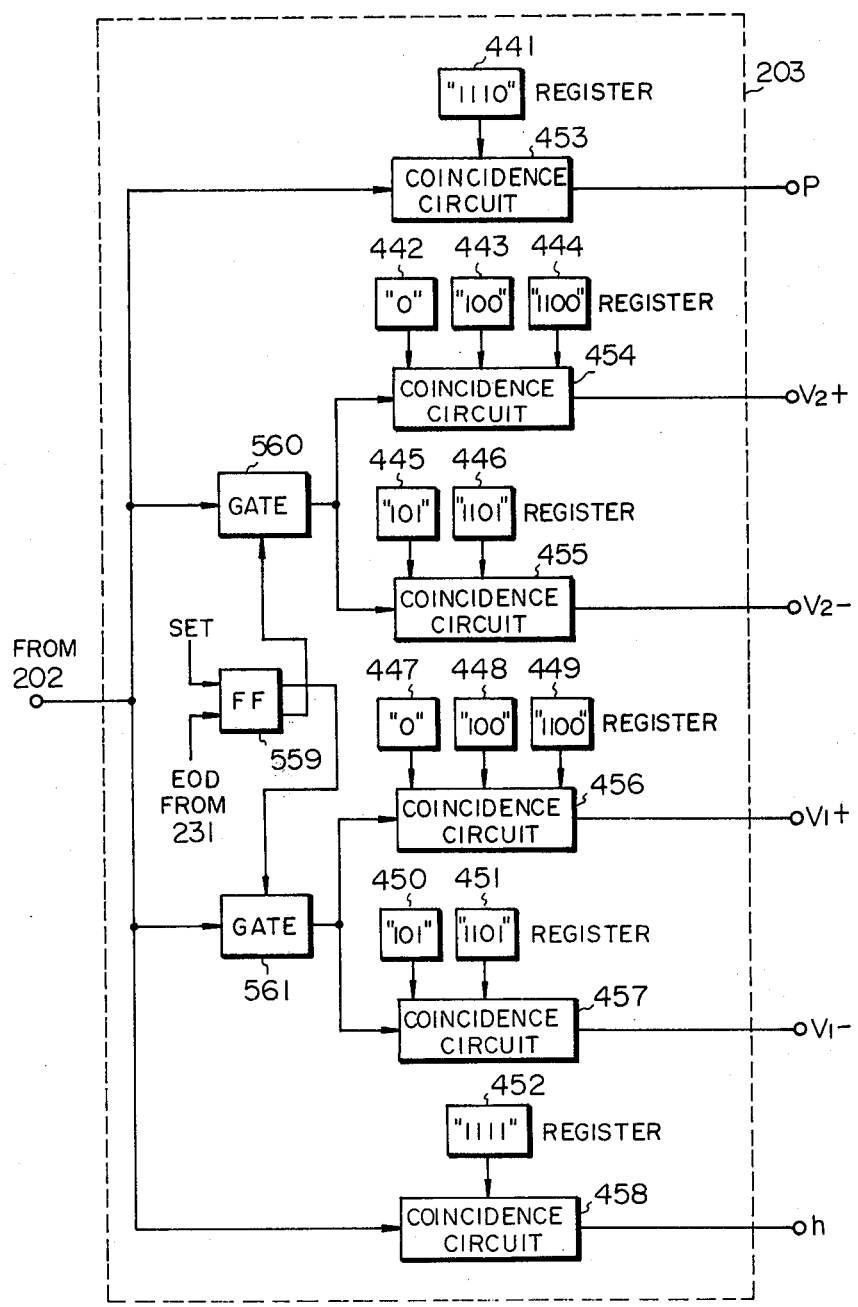
FIGS. 5B, 5C and 5D show in block form specific operative examples of circuits for use in the decoding apparatus of FIGS. 5A and 8A.

The first word $b_1a_1$ and the second word $b_2a_2$ are identified in this order by the operations of a flip-flop and two gates in FIG. 5B.

Figure 5C:
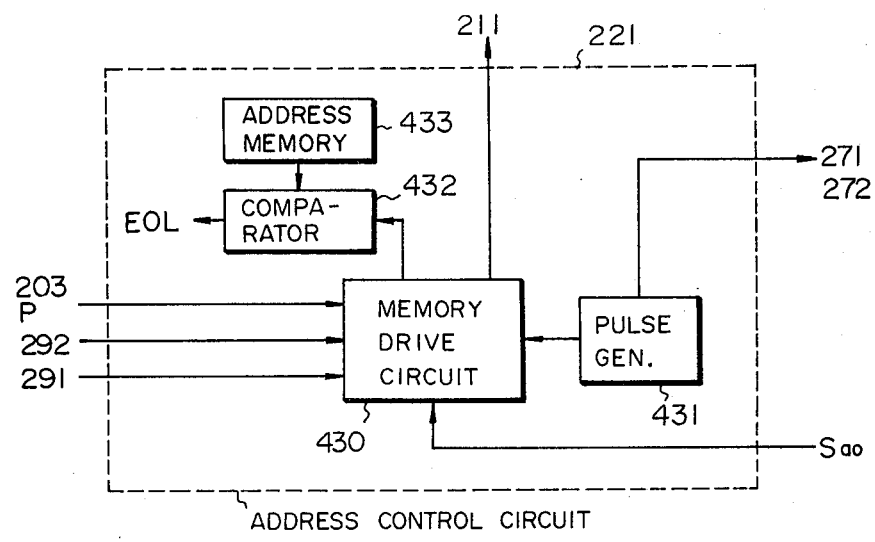

The address control circuit 221 has such a construction as depicted in FIG. 5C, in which when any one of the outputs p, $v_1+$, $v_1-$ and $v_2+$, $v_2-$ from the mode code indentify circuit' 203 is "1", pulses are apolied from the $a_0$ address register 300 via $Sa_o$ to the reference line memory 211 to shift it bit by bit. When the identify circuit 203 provides "1" on the line p (that is, in the Pass mode), the address control circuit 221 shifts the reference line memory 211 from the address of the picture element $a_o$ to start detection of the distance $b_1b_2$. The reference line memory 211 has stored therein information of the previous line via the coding line memory 212.

The change picture element detector 240 has the same construction as the aforementioned one of FIG. 4B and provides an output "1" upon each detection of a picture element different from the immediately preceding one in the signal series applied from the reference line memory 211. At the moment when the change picture element detector 240 provides the output "1", if the detected change picture element is different in sign from the picture element $a_0$, the output "1" is applied via the exclusive OR circuit 293 to the $b_1$ detector 251 (an AND circuit ) to produce an output "1" on a line $b_{1p}$. The $a_0b_1$ counter 272 receives pulses from the address control circuit 221 and counts the number of picture elements occurring in the time interval from the $a_0$ address to $b_1$. The $b_2$ detector 252 outputs "1" on a line $b_{2p}$ when another change picture element is detected by the change picture element detector 240 after detection of the picture element $b_1$ by the $b_1$ detector 251. This comprises a flip-flop and an AND circuit.

The $a_0b_2$ counter 271 receives pulses from the address control circuit 221 and counts them occurring in the time interval from the $a_0$ address to $b_2$. By the output "1" on the line $b_{2p}$, the address control circuit 221 once stops sending out of the shift pulses.

The information of the $a_2b_2$ counter 271 is applied to the $a_0$ register 300 via the gate 281, which is opened by the provision of the output "1" on the line p of the mode code identify circuit 203.

In a case where the mode code identify circuit 203 provides "1" on the line $v_1+$ or $v_1-$ (the first word in the Vertical mode), the output "1" from the OR circuit 291 is applied to the address control circuit 221 and the $b_1a_1$ decoder 231. As a consequence, decoding relating to the above-said picture element $b_1$ takes place, and the count value of the $a_0b_1$ counter 2712 indicates the address of the picture element $b_1$ relative to the picture element $a_0$.

The $b_1a_1$ decoder 231 reads signals of one word from the input buffer memory 202 and decodes them. The decoded value is added by the adder 261 to the value of the $a_0b_1$ counter 272 and, at the same time, subtracted by the subtractor 262 from the value of the $a_0b_1$ counter 272. Where the output line $v_1+$ of the mode code indentify circuit 203 is "1", the gate 284 is opened, so that the information of the adder 261 is applied via the OR circuit 294 to the address control circuit 222. In contrast thereto, where the output line $v_1-$ of the mode code identify circuit 203 is "1", the gate 285 is opened, passing on the information of the subtractor 262 to the address control circuit 222 via the OR circuit 294.

Similarly, in the case of the second word in the Vertical mode, by the output $v_2+$ or $V_2-$ the output "1" from the OR circuit 292 is applied to the address control circuit 221 and the $b_2a_2$ decoder 232 to start decoding of the picture element $b_2$, and the count value of the $a_2b_2$ counter 271 indicates the address of the picture element $b_2$ relative to the picture element $a_0$. The $b_2a_2$ decoder reads signals of the next one word from the input buffer memory 202 and decodes them. The decoded value is added by the adder 263 to the value of the $a_0b_2$ counter 271 and, at the same time, subtracted by the subtractor 264 from the value of the $a_0b_1$ counter 271.

When the output $v_2+$ from the mode code identify circuit 203 is "1", the gate 286 is opened to apply therethrough the information of the adder 263 to the address control circuit 222 via the OR circuit 295 and to the $a_0$ register 300 via the gate 282 (which is opened by the output "1" from the OR circuit 292).

Similarly, in a case where the output $v_2$ from the mode code identify circuit 203 is "1", the gate 287 is opened to apply therethrough the information of the subtractor 264 to the address control circuit 222 via the OR circuit 295 and to the $a_0$ register 300 via the gate 282.

Figure 5D:
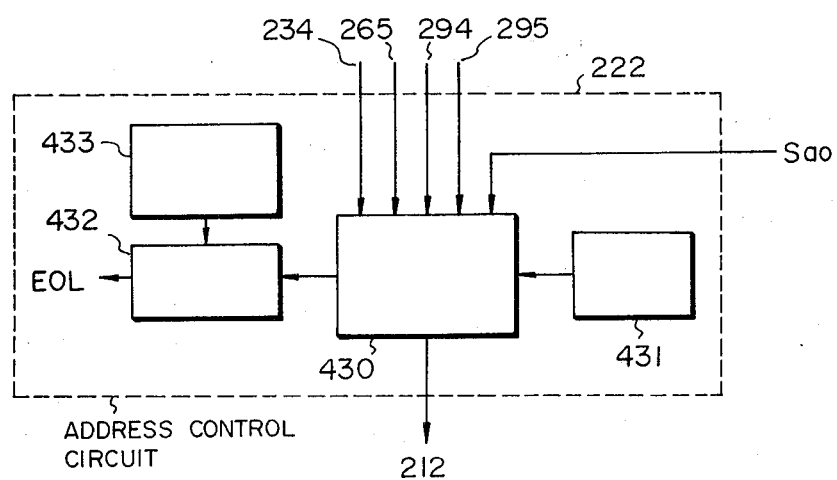

The address control circuit 222 has such a construction as depicted in FIG. 5D, which sets up the address of the picture element $a_0$ on the basis of the information transmitted thereto via the OR circuit 294, makes the information of the decoding line memory 212 from the picture element $a_0$ to a picture element immediately preceding the picture element $a_1$ to be the same as the picture element $a_0$ and inverts the information of the picture element $a_1$ relative to the information of the picture element $a_0$.

Further, the address control circuit sets up the address of the picture element $a_2$ on the basis of the information applied via the OR circuit 295, makes the information of the decoding line memory 212 from the picture element $a_1$ to a picture element immediately preceding the picture element $a_2$ to be the same as the picture element $a_1$ and inverts the information of the picture element $a_2$ relative to the information of the picture element $a_1$.

In a case where the line h of the mode code identify circuit 203 becomes "1" (the Horizontal mode), the $a_0a_1$ decoder 233 and $a_1a_2$ decoder 234, sequentially reads signals of two words from the input buffer memory 202. The first one word is decoded by the $a_0a_1$ decoder 233, and the decoded output is applied to the address control circuit 222. The next one word is decoded by the $a_1a_2$ decoder 234, and the two decoded values are added together by the adder 265, the output from which is provided to the address control circuit 222 and to the $a_0$ register 300 via the gate 283 (which is opened when "1" is provided on the line h of the circuit 203).

The address control circuit 222, as is the case with the Vertical mode, sets up the addresses of the picture elements $a_1$ and $a_2$, makes the information of the decoding line memory 212 from the picture element $a_0$ to a picture element immediately preceding the picture element $a_1$ to be the same as the information of the picture element $a_0$, makes the information of the picture element $a_1$ to be different from the information of the picture element $a_0$, and then makes the information from the picture element $a_1$ to a picture element immediately preceding the picture element $a_2$ to be the same as the information of the picture element $a_1$ and inverts the information of the picture element $a_2$ relative to the information of the picture element $a_1$.

The $a_0$ address register 300 is restored the address of the picture element $a_2$ or $b_2$, so that the $a_2$ or $b_2$ address becomes a new $a_0$ address. This new information is provided to the address control circuits 221 and 222 to set the $a_0$ address and re-start decoding.

The output from the address control circuit 222 is applied to the decoding line memory 212 and outputted therefrom at the output terminal 310.

Also in respect of the above decoding apparatus, the resetting conditions for the detectors, the registers, the counters and so forth have been neither described nor shown in the drawings; but required ones of these circuits (the decoders 231, 232, 233 and 234, the counters 271 and 272, the adders 261, 263 and 265, the subtractor 262, the detectors 251 and 252 and so forth) are reset for each setting of the $a_0$ address.

The termination of one line is achieved by supervising the $a_0$ address with the address control circuit 222, and at the moment of the address of the picture element $a_0$ becoming the address of the line terminating picture element, decoding of that line is completed, and decoding of the next line is resumed.

In the above embodiment, in order to enhance the coding efficiency of the information source, the Horizontal or Vertical mode is selected by making a comparison between the number of bits $[a_0a_1]+[a_1a_2]$ and the number of bits $[b_1a_1]+[b_2a_2]$, and change picture elements are coded in pairs; but it is considered to encode two change picture elements by making a comparison between the numbers of bits $[a_0a_1]$ and $[b_1a_1]$ at first and then selecting the Horizontal or Vertical mode in dependence on whether the aforementioned condition:

$$[a_0a_1]+[a_1a_2]<[b_1a_1]+[b_2a_2] \qquad (b)$$

is established or not when the condition $[a_0a_1]<[b_1a_1]$ . . . (a) is established.

In this case, if the condition $[a_0a_1]<[b_1a_1]$ is not established, only $[b_1a_1]$ is naturally coded and outputted, and the picture element $a_1$ is set as a new start picture element $a_0$. In these cases, the criterion for the selection of each mode becomes severer to provide for further enhanced coding efficiency, as compared with that in the foregoing.

This will hereinafter be described by way of example.

Figure 6A:
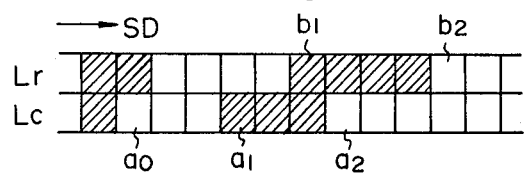
Figure 6B:
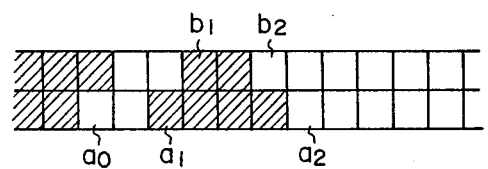
Figure 6C:
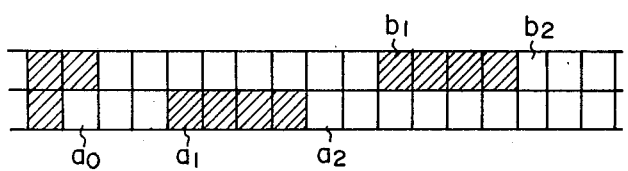

FIGS. 6A, 6B and 6C illustrate examples of facsimile signals, blank blocks representing white picture elements and hatched blocks black picture elements, as in the foregoing. Exactly the same definitions as the aforementioned are used for the start picture element $a_0$ and the other change picture elements $a_1$, $a_2$, $b_1$, $b_2$, etc.

As will hereinbelow be described, the picture elements on the coding line and the reference line are successively collated with each other to detect the change picture elements on the both scanning lines for coding.

(Procedure 1): This is exactly the same as that in the foregoing, and hence will not be described again.

(Procedure 2): In a case where the change picture element $a_1$ is detected on the coding line prior to the detection of $b_2$ of the change picture elements $b_1$ and $b_2$ on the reference line (refer to FIG. 6A), the number of bits $[a_0a_1]$ that the number of bits encoded from the distance $a_0a_1$ in the Horizontal mode is added with a mode code "1111" is obtained. At the same time, the distance $b_1a_1$ is encoded in the Vertical mode to obtain the number of bits $[b_1a_1]$. (Refer to Table 1.)

Next, these encoded numbers of bits are compared with each other. When the condition $[a_0a_1] \geq [b_1a_1]$ is established, it is judged that high correlation exists between the change picture element $a_1$ to be coded and the reference picture element $b_1$, and the distance $b_1a_1$ is selected in the Vertical mode to shift a new start picture element to the position of the picture element $a_1$. Next, when the condition $[a_0a_1]<[b_1a_1]$ is established, the next (Procedure 3) is followed.

(Procedure 3): Scanning of picture elements is achieved until the change picture element $a_2$ and the reference picture element $b_2$ occurs, and the distance $a_0a_1$ and $a_1a_2$ are coded in the Horizontal mode, and then the number of bits $[a_0a_1]+[a_1a_2]$ that the coded values of the abovesaid distances are added with the mode code "1111" is obtained. At the same time, the number of bits $[b_1a_1]+[b_2a_2]$ that the distance $b_1a_1$ and $b_2a_2$ are coded in the Vertical mode is obtained.

The coded number of bits thus obtained, $[a_0a_1]+[a_1a_2]$ and $[b_1a_1]+[b_2a_2]$ are compared with each other to select any of coding modes in accordance with the following conditions:

$$[a_0a_1]+[a_1a_2] \geq [b_1a_1]+[b_2a_2]$$

Where this condition is established, the Vertical mode of operation is performed to encode the distances $b_1a_1$ and $b_2a_2$ in a pair and to shift a new start picture element to the position of the picture element $a_2$.

Next, when $[a_0a_1]+[a_1a_2]<[b_1a_1]+[b_2a_2]$ is set up, the Horizontal mode of operation is performed to encode the distances $a_0a_1$ and $a_1a_2$ in a pair and to shift a new start picture element to the position of the picture element $a_2$.

The following will describe the above in respect of the cases of FIGS. 6A, 6B and 6C.

In the following description, $$[a_0a_1]<[b_1a_1] \qquad (a)$$

will be referred to as the first conditional formula, and $$[a_0a_1]+[a_1a_2]<[b_1a_1]+[b_2a_2] \qquad (b)$$

will be referred to as the second conditional formula.

In the example of FIG. 6A, from Table 1, $$[a_0a_1]=11111000=8 \text{ bits, and}$$

$[b_1a_1] = 11011 = 5$ bits.

Hence, the first conditional formula (a) is not set up. Consequently, in this case, the Vertival mode of operation is performed to encode $[b_1a_1]$, resulting in "11011".

Similarly, in the case of FIG. 6B, $[a_0a_1] = 11110111 = 8$ bits $[b_1a_1] = 101 = 3$ bits $[b_2a_2] = 100 = 3$ bits Therefore, $[a_0a_1]+[a_1a_2]=11$ bits, and $[b_1a_1+[b_2a_2]=6$ bits; and the second conditional formula (b) is not set up. As a consequence, in this example, the Vertical mode is selected to encode $[b_1a_1]+[b_2a_2]$, so that "101" and "100" are encoded in a pair.

In FIG. 6C, $[a_0a_1] = 11111000 = 8$ bits $[b_1a_1] = 1101000001 = 9$ bits

Hence, the first conditional formula (a) is set up. Next, $[a_1a_2] = 011 = 3$ bits $[b_2a_2] = 1101000001 = 9$ bits $[a_0a_1]+[21a_2]=11$ bits, and $[b_1a_1]+[b_{aa2}]=18$ bits;

and the second conditional formula (b) is also set up, so that in the Horizontal mode, coded outputs of $[a_0a_1]$ and $[a_1a_2]$ become "11111000" and "011" respectively.

In the above description, when $[a_0a_1]<[b_1a_1]$ is established, the Horizontal or Vertical mode is selected in dependence on whether $[a_0a_1]+[a_1a_2]<[b_1a_1]+[b_2a_2]$ is established or not. But, as this conditional formula, for example, $[a_0a_1]<[b_1a_1]+m$ $[a_0a_1]+[a_1a_2]<[b_1a_1]+[b_2a_2]+m$ (m being an integer)

may be used, as is the case with the foregoing embodiment, or it is also possible to use $a_0a_1<b_1a_1+m$ $(a_{0a1}+a_1a_2)<(b_1a_1+b_2a_2)+m$ (m being an integer)

Further, it is also possible to use codes other than the MH code and D(n) code.

Next, a description will be given of the circuit arrangement for carrying the above embodiment into practice. On the side of the coding apparatus, it is necessary to make some modifications of the circuit arrangement such as separately shown in FIGS. 7A and 7B, which are to be combined at a VII—VII line, in which a comparator 61 for detecting $[a_0a_1]<[b_1a_1]$ is provided in addition to the comparator 60 and, for encoding $[b_1a_1]$ in the Vertical code when the abovesaid condition is not fulfilled, an $a_1$ address counter 84 and gates 77 and 78 are provided in FIG. 4A.

Figure 8A:
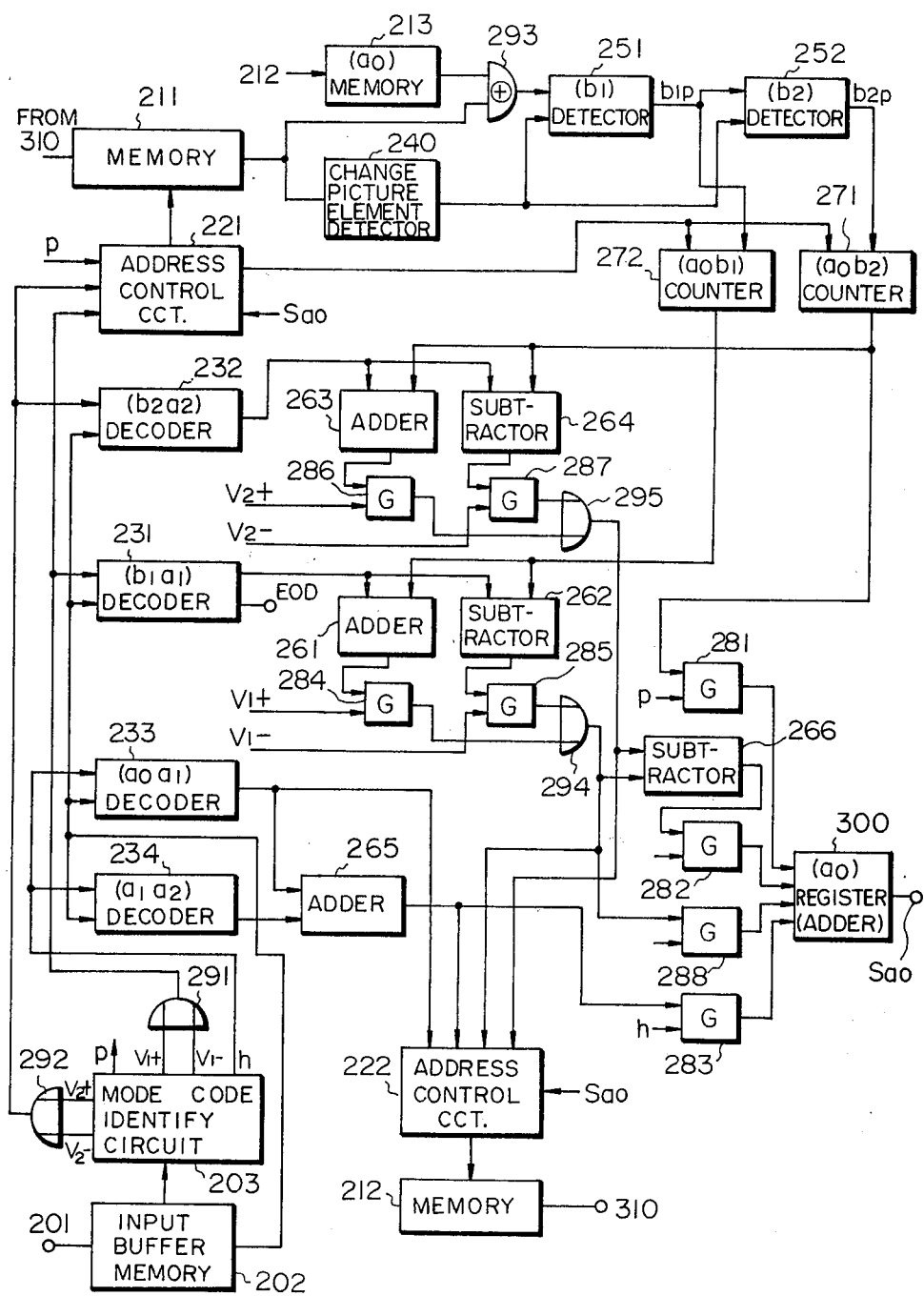

On the side of the decoding apparatus, it is also necessary to somewhat modify the mode code identify circuit 203 or so and to additionally provide a subtractor 266 and a gate 288 in FIG. 5A, so as to provide for the case of the outputs $v_2^+$ and $v_2^-$ being produced, as shown in FIG. 8A. Since it is believed that these modifications of the circuit arrangement can sufficiently be understood from the foregoing description and the prior art, no detailed description will be given.

Next, a description will be given of a system of suppressing degradation of the picture quality of the reproduced picture due to a code error.

In the coding system of this invention, a picture signal of the coding line is encoded using picture signal information of a reference line immediately preceding the coding line. Accordingly, also on the side of the decoding apparatus, the picture signal of the decoding line is decoded using the picture signal information of the reference line already decoded. Thus, coding and decoding are performed successively using the picture signal information of scanning lines immediately preceding the coding and decoding lines respectively; if a code error occurs due to the influence of circuit noises and the like to cause incorrect reproduction of picture signals of a certain line, picture signals of the succeeding lines are not reproduced correctly, resulting in markedly degraded picture quality of the reproduced picture.

Accordingly, it is necessary to detect occurrence of a code error, to suppress degradation of the picture quality of the line in which the code error has occured and to rapidly restore from the code error state so that the deterioration of the picture quality due to the code error does not spread to other lines.

Figure 9:
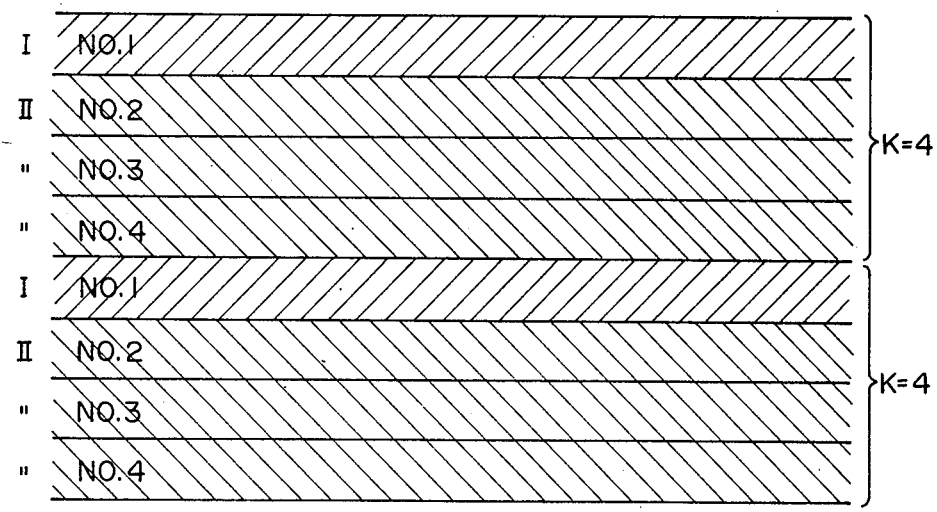

Accordingly to this invention, these objects are achieved in the following manner: On the side of the coding apparatus, a detectable, so-called self-synchronized first control code is inserted, from a desired position in a code series, in a predetermined period of a picture signal, for example, immediately before starting of coding of a line No. 1 every four lines (K=4) as shown in FIG. 9; picture signal information of the line No. 1 is encoded (into, for instance, a runlength code RL) without using picture signal information of a line immediately preceding the line No. 1; scanning lines No. 2, No. 3, . . . No. K immediately following the line No. 1 are subjected to the two-dimensional successive coding of this invention; and a second control code, different from the first control code for detecting the occurrence of a code error is inserted just before the signal of each of the lines Nos. 2 to K to be coded. On the side of the decoding apparatus, when the self-synchronized first control code is detected, it is decoded as the line No. 1 without using information of the immediately preceding line on the assumption that the directly following code series has been encoded into a runlength code RL. When the second control code is detected, it is decoded using information of the immediately preceding line on the assumption that it has been encoded according to this invention. Directly after completion of decoding of each line, the presence or absence of the first or second control code is checked to effect error checking. Where an error is detected, the line to be decoded in which the error is detected is subjected to processing such as replacement with a picture signal of the immediately preceding line to thereby suppress deterioration of the picture quality. Upon detection of the error, the decoding operation is once stopped; but when the self-synchronized first control code is detected, decoding of the run-length code TL is immediately started to restore from the error state.

Figure 10:
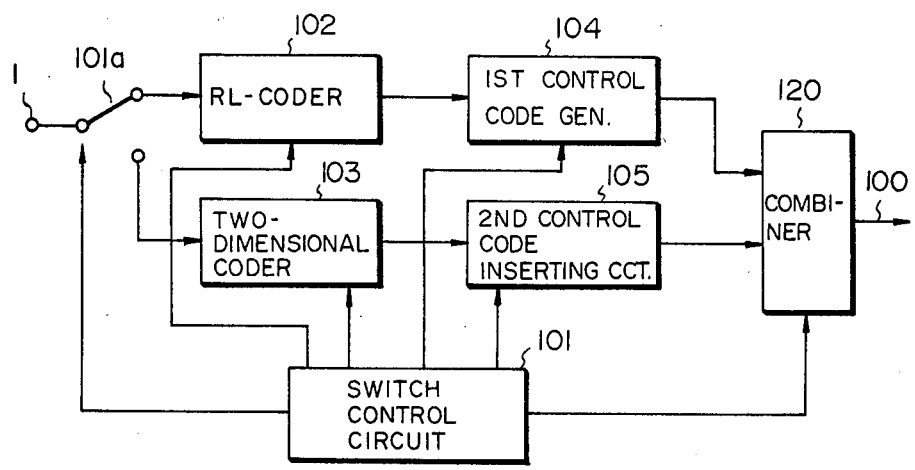
FIGS. 10 and 11 show in block form another embodiment of this invention and an example of the decoding apparatus corresponding thereto.
Figure 11:
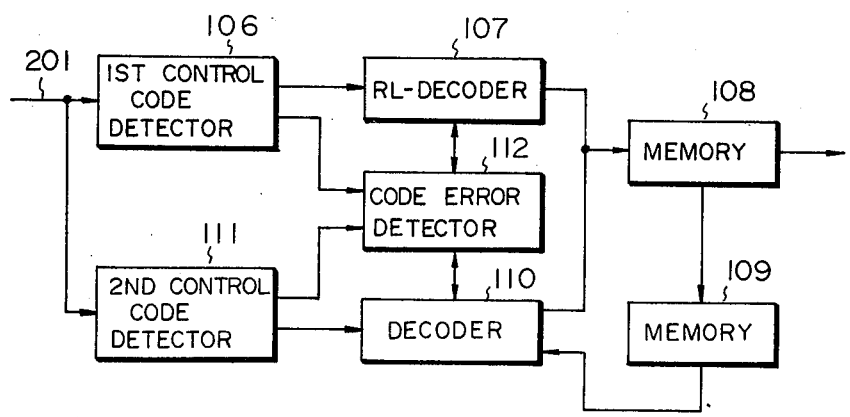

FIG. 10 illustrates in block form a coding apparatus embodying the present invention based on such principles, and FIG. 11 a corresponding decoding apparatus.

In FIG. 10, a facsimile picture signal input line 1 is connected via a switch 101a to an RL coder 102 every K lines under the control of a switch control circuit 101. At this time, a first control code generator 104 generates the first control code, and the RL coder 102 encodes a line (No. 1) into a run-length code. Upon completion of this encoding, the switch 101a is connected to a two-dimensional coder 103 of this invention, such as shown in FIG. 4A, to thereby achieve two-dimensional coding of lines Nos. 2 to K according to this invention and the second control code is inserted by a second control code generator 105 just before the signal of each scanning line to be coded.

On the side of the decoding apparatus shown in FIG. 11, when the first control code is detected by a first control code detector 106, the run-length code is decoded by a run-length code decoder 107 for one line (No. 1) only, and the reproduced picture element information is stored in a line memory 108, and upon completion of decoding of the line No. 1, the contents of the line memory 108 are transferred to a line memory 109. Thereafter, successive decoding of the lines No. 2, No. 3, ... No. K corresponding to the coding of this invention is effected by such a decoder 110 as shown in FIG. 5A using the contents of the line memory 109 as the information of the reference line. Upon completion of decoding of each line, the control codes are detected by the control code detectors 106 and 111, and it is checked by a code error detector 112 for occurrence of a code error. Once a code error has occurred, no decoding takes place until the scanning line No. K. Then, upon detection of the first control code, an ordinary decoding operation is started to restore from the code error state.

As has been described above in detail, the present invention enables highly efficient coding without depending on correlation between adjacent lines of signals, by properly selecting the two kinds of coding systems in which a signal having high correlation between adjacent lines, such as a monochrome binary facsimile signal, in encoded with high efficiency using a distance between a change picture element to be encoded and an adjoining one, and in which in a case of a part having no correlation to a line just above it, just like a first line of a document, a change picture element is encoded using a distance between it and another picture element of the same line. As compared with the invention proposed in our prior application, the present invention has the advantages of enhanced coding efficiency, reduced transmission time and decreased amount of memories for storage or processing of information.

Further, the present invention has the advantage that by inserting a self-synchronized first control code, for example, every K scanning lines, encoding only one scanning line into a run-length code, encoding the subsequent scanning lines according to this invention and then checking for a code error upon completion of coding of each scanning line, degradation of the picture quality due to the code error is prevented from spreading, thereby to enable rapid restoration from the code error state.

In the following, another embodiment of this invention relating to the second object will now be described, in which the two dimensional coding principle as described above and the one dimensional coding principle, such as the run-length coding principle, are adaptively adopted.

Figure 6D:
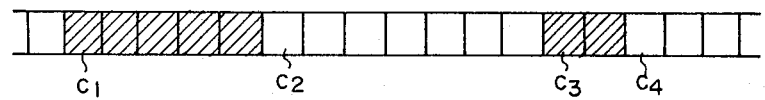

Next, an example of the one-dimensional coding will be described. FIG. 6D shows an example of a facsimile signal. In the one-dimensional coding system, a run from a picture element $C_1$ to a picture element directly before a picture element $C_2$ consists of five black picture elements, and hence is coded into "0011", for example, according to the MH code in Table 1; a run from the picture element $C_2$ to a picture element immediately before a picture element $C_3$ consists of seven white picture elements, and hence is coded into "1111"; and a run from the picture element $C_3$ to a picture element immediately before a picture element $C_4$ consists of two black picture elements, and hence is coded into "11". These coded series are stored or outputted as a one-dimensional coded line.

The following will describe examples of circuits for carrying this invention into practice in accordance with the principles described above.

Figure 7B:
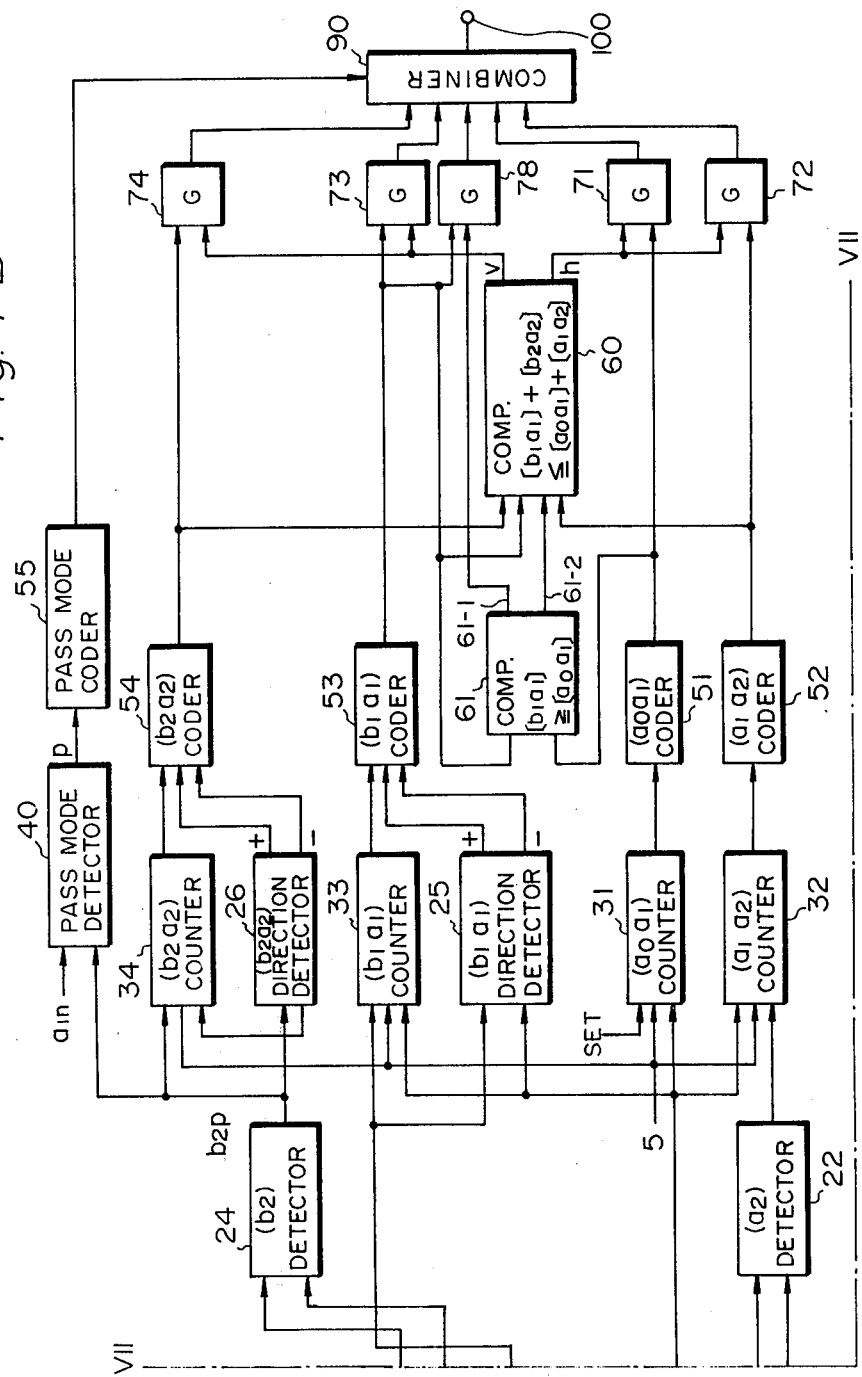
Figure 12:
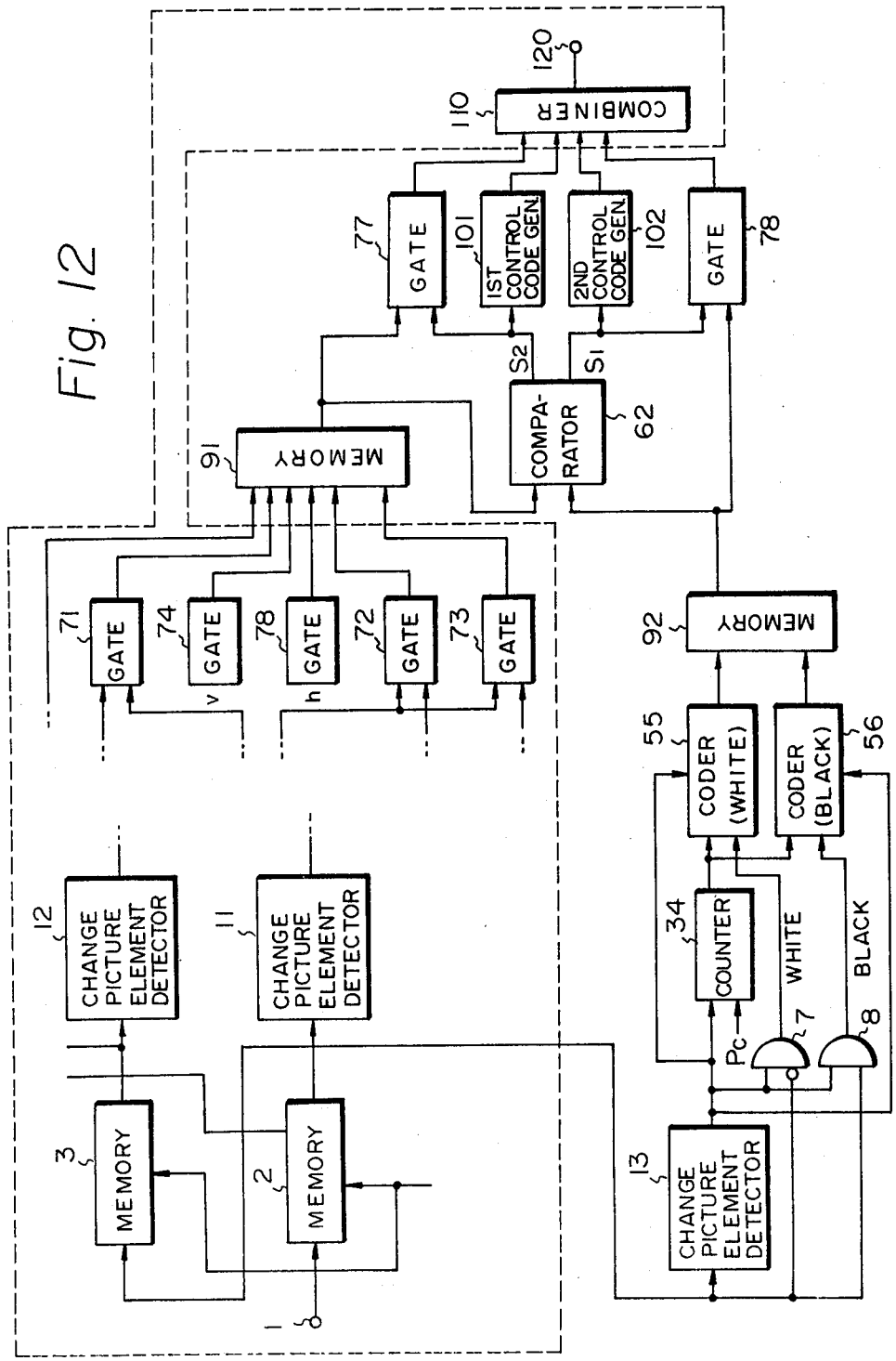
FIGS. 12 and 15 are block diagrams each illustrating another embodiment of this invention.

FIG. 12 is an example of a coding device, in which the part indicated by a dotted enclosure is the same as FIGS. 7A and 7B. A change picture element detector 13 is composed of a 1-bit memory and an exclusive OR circuit as shown in FIG. 4B. There are further provided a NAND circuit 7, and AND circuit 8, a counter 34, coders 55 and 56, coded signal memories 91 and 92, a comparator 62, gates 77 and 78, a first control code generator 102, and a second control code generator 101.

Next, the construction and operation of this embodiment will be described in detail. A facsimile signal to be coded is provided from the input terminal 1 to the coding line memory 2 for storage therein. Before this time, as a signal of a reference line, a signal of the preceding line stored in the line memory 2 is transferred to the reference line memory 3 for storage therein. The $a_0$ memory 4 has stored therein level of the starting picture element $a_0$, as will be described later on. Reading of the coding line memory 2 and the reference line memory 3 simultaneously starts from the position of the starting picture element $a_0$ under the control of the address control circuit 5.

The change picture element detectors 11, 12 and 13 respectively are each constructed, as shown in FIG. 4B, and compare the picture element signals read out of the line memories 2 and 3, respectively, with immediately preceding picture element signals of each line to output "0" or "1" in dependence on whether the former signals are of the same level as the latter signals or not.

The $b_1$ detector 23 is an AND circuit which provides "1" on an output line $b_{1p}$ when a change picture element is detected by the change picture element detector 12 and level of the detected change picture element differs from that of the starting picture element $a_0$, that is, when the output from the exclusive OR circuit 6 is "1". The $b_2$ detector 24 provides "1" on an output line $b_{2p}$ in a case where a change picture element is detected by the change picture element detector 12 after detection of the change picture element $b_1$ by the $b_1$ detector 23; this $b_1$ detector 24 can be made up of one flip-flop and an AND circuit. The Pass mode detector 40 is an AND circuit which provides "1" on an output line p, judging that the mode of operation is the Pass mode in a case where the picture element $a_1$ has not been detected at the moment of occurrence of "1" on the output line $b_{2p}$ (in this case, $a_{1n}$ which is the output $\overline{Q}$ of a flip-flop in the $a_1$ detector 21 is "1"), as will be described later.

With "1" on the output line p, the Pass mode coder to the coded signal memory 91. Following this, a new starting picture element is shifted to the position just under the picture element $b_2$ in the following manner: Upon occurrence of "1" on the line $b_{2p}$, the $b_2$ address register 81 stops counting of pulses from the address control circuit 5 and stores the count value. This information is applied via the gate 74 to the $a_0$ address register 84 at the moment of the Pass mode detector 40 providing "1" on the line p. The contents of the $a_0$ address register 84 are applied to the address control circuit 5 to re-start the coding operation with the new starting picture element $a_0$.

The change picture element detector 11, when detecting a change picture element, provides an output "1" to the $a_1$ detector 21 (a flip-flop). As a result of this, the information on the lines $a_{1p}$ and $a_{1n}$ change from "0" to "1" and from "1" to "0", respectively. The $a_2$ detector 22 is a flip-flop which outputs "1" on a line $a_{2p}$ when a change picture element is detected by the change picture element detector 11 after the picture element $a_1$ is detected by the $a_1$ detector 21 ("1" on the line $a_{1p}$). The $a_0a_1$ counter 32 starts counting of pulses from the moment of setting $a_0$ in the address control circuit 5, but stops the counting upon reception of "1" from the line $a_{1p}$ and provides the count value to the $a_0a_1$ coder 52. The $a_0a_1$ coding circuit encodes the count value with "1111" added to its head, using such a code table as shown in the column of the Horizontal mode of Table 1. The $a_1a_2$ counter 31 starts counting with "1" on the line $a_{1p}$ and stops the counting with "1" on the line $a_{2p}$ and provides the count value to the $a_1a_2$ coder. The $a_1a_2$ coder 51 encodes the count value using such a code table as shown in the column MH (xy) of Table 1. The $b_1a_1$ counter 33 receives the outputs from the lines $b_{1p}$ and $a_{1p}$ and starts pulse counting with a first appearing "1" in either one of the outputs and stops the counting with a next appearing "1" in the other. To the $b_1a_1$ direction detector 25 are also applied the outputs from the lines $b_{1p}$ and $a_{1p}$ and, with the circuit construction shown in FIG. 4C, this detector outputs "1" on a line + when "1" of the line $b_{1p}$ appears earlier than or simultaneously with "1" of the line $a_{1p}$ but, in the opposite case, provides an output "1" on a line −.

The $b_1a_1$ coder 53 encodes $b_1a_1$ with a sign + or − added thereto on the basis of the count value of the $b_1a_1$ counter 33 and the output of the line + or − from the $b_1a_1$ direction detector 25, as shown in the column of the Vertical mode of Table 1. The bit numbers encoded by the coders 52 and 53 are compared in magnitude with each other in the comparator 61; when the condition $[a_0a_1] > [b_1a_1]$ is established, "1" is provided on the line V (Vertical mode), whereas when this condition is not established, "1" is provided on the line h (Horizontal mode). In a case of the Vertical mode in which "1" is outputted on the line V of the comparator 61, the coded signal of the $b_1a_1$ coder 53 is provided via the gate 71 to the coded signal memory 91. On the other hand, in the Horizontal mode in which "1" is yielded on the line h, the gates 72 and 73 are opened to apply therethrough the coded signals of the $a_0a_1$ and $a_1 a_2$ coders 52 to the coded signal memory 91.

The change picture element detector 13 is a detector for the one-dimensional coding. Upon detection of a change picture element by this detector, the counter 34 starts counting of clock pulses Pc and, upon detection of the next change picture element, this counting is once stopped, and the count value at this moment is coded by the coder 55 or 56 of the next stage.

The output from the counter 34 is coded by the coder 55 or 56 in dependence on whether the signal is white or black. Namely, a signal from the coding line memory 2 and the output from the change picture element detector 13 are applied to the NAND circuit 7 and the AND circuit 8, and the outputs from the NAND circuit 7 and the AND circuit 8 are provided to the coders 55 and 56 respectively; the coder 55 or 56 operation in dependence on whether the outputs from the NAND circuit and the AND circuit are each "0" (white) or "1" (black). In this manner, the count value of the counter 34 is applied to the coder 55 or 56 and coded therein by the MH code of Table 1, thereafter being provided as a one-dimensional coded train to the coded signal memory 92. The coded output signal thus stored in the coded signal memory 91 is a two-dimensional coded signal, thereas the coded output signal stored in the coded signal memory 92 is a one-dimensional coded signal. These coded signals are applied to the comparator 62 and compared with each other, for example, in the number of bits for each line in the outputs from the memories 91 and 92 for selecting a more advantageous one of the both memory output signals.

Where the one-dimensional coding is judged to be advantageous as a result of the comparison in the comparator 62, an output $S_1$ becomes "1" to open the gate 78 for passing on the information of the coded signal memory 92 to the signal combiner 110. At the same time, the first control code generator 102 provides a first control code (a first line synchronizing signal LSS1), for example, "01111111" representing that the line is a one-dimensional coded line. This control code is added to the head of the information of the coded signal memory 92.

In case the two-dimensional coding is judged to be advantageous as a result of the comparison in the comparator 62, an output $S_2$ becomes "1" to open the gate 77 for applying therethrough the information of the coded signal memory 91 to the signal combiner 110. At the same time, the second control code generator 101 provides a second control code (a second line synchronizing signal LSS2), for example, "01111110" indicating that the line is a two-dimensional coded line. This control code is added to the head of the information of the coded signal memory 91. The signal combiner 110 combines the control code from the control code generator 101 or 102 and the signal from the gate 77 or 78 into a composite signal, which is sent out from the output terminal 120 after being converted into an output signal series.

In a case of producing the first and second control codes in the form of "01111111" and "01111111" respectively, as described above, in order to make these control codes distinguishable from other codes, it is necessary, for example, to compulsorily insert "0" in the control codes every five "1"s occurring successively in the coded signals, like "1111101".

Needless to say, the decoding side decodes the coded signals removing "0" next to "11111" in the coded signal.

For the sake of brevity, the conditions for resetting the detectors, registers, counters and so forth are neither described in the foregoing nor shown in the drawings; but, required ones of these circuits (the $b_2$ detector 24, the $a_1$ detector 21, the $a_2$ detector 22, the registers 81, 82 and 83, the $b_1a_1$ direction detector 25, the counters 31, 32 and 33 and so forth) are reset for each setting of the picture element $a_0$.

The interruption of the operation of this coding device is placed under the control of the address control circuit. Namely, the $a_0$ address is always watched by the address control circuit 5, and the coding is stopped at the moment when the $a_0$ address becomes a line terminating picture element, and the $a_0$ address is newly set to a line starting picture element, and then coding of the subsequent line is resumed.

Figure 13:
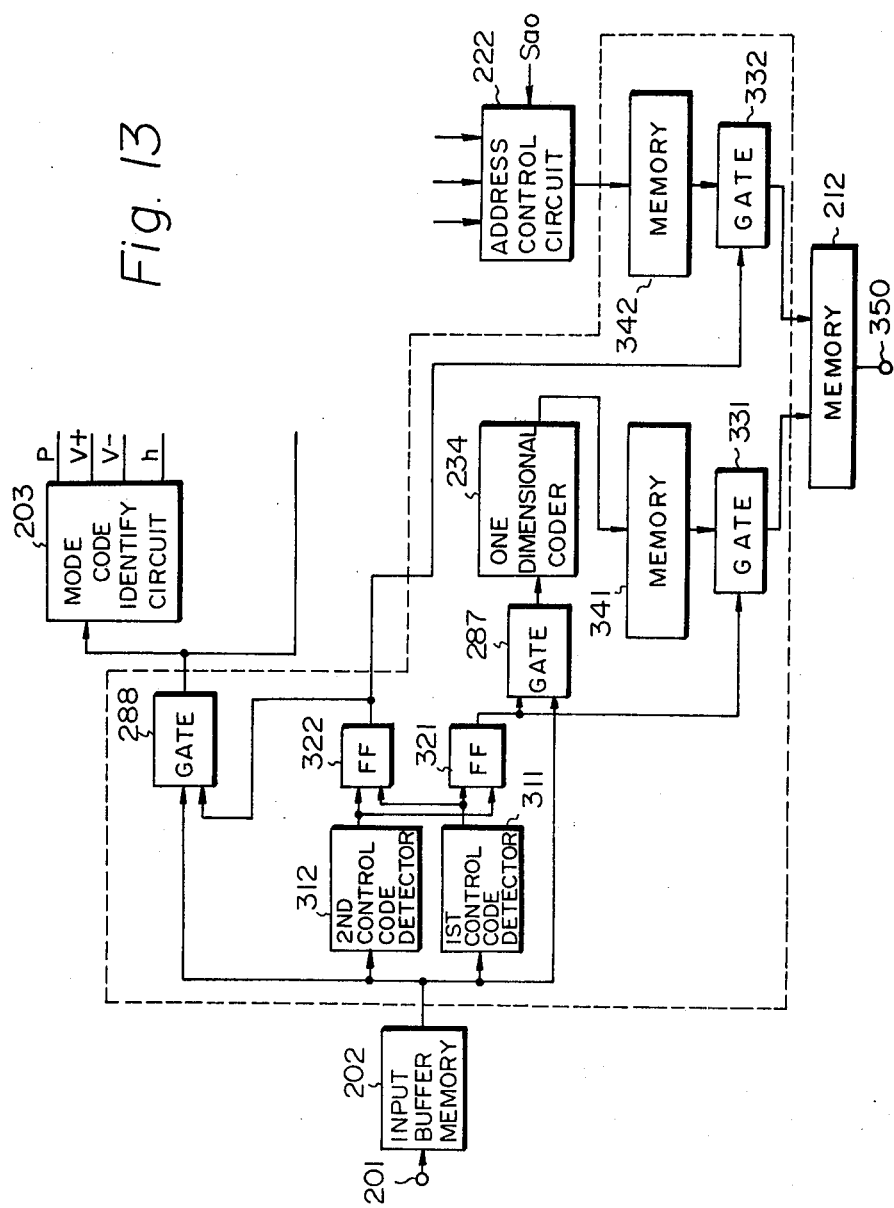
FIG. 13 is a block diagram illustrating an example of a decoding apparatus for a facsimile signal encoded by the embodiment of FIG. 12.

An example of a decoding device for receiving a facsimile signal encoded by the embodiment of FIG. 12 is shown in FIG. 13, in which circuits enclosed by a dotted enclosure are further added to the decoding device shown in FIG. 8A. The enclosure part comprises a first control code detector 311, a second control code detector 312, flip-flops 321 and 322, gates 287, 331 and 332, a one dimensional coder 234, and decoded signal memories 341 and 342.

The following will describe the construction and the operation of the decoding device of FIG. 13 in detail. A coded signal from the input terminal 201 is once stored in the input buffer memory 202. The signal from the input buffer memory 202 is checked first by the first and second control code detectors 311 and 312 as to whether the signal is the one-dimensional or two-dimensional coded one.

If the inputted control code is, for example, "01111110", the signal is judged as the two-dimensional coded one, and the second control code detector 312 provides an output "1" to set the flip-flop 322, opening the gate 288. When the control code is, for example, "01111111", the signal is judged as the one-dimensional codes signal, and the first control code detector 311 yields an output "1" to set the flip-flop 321, opening the gate 287. At this time, the flip-flop 322 is reset; consequently, the gate 288 is cut off.

In a case of the two-dimensional coded signal being applied to open the gate 288, the mode code identify circuit 203, which has such a construction as shown in FIG. 5B, responds to opening of the gate 288 to read a required number of signals (for example, four bits at most, as shown in Table 1) from the input buffer memory 202, identifying the mode of the input signal, i.e. any of the Pass mode, the Horizontal mode and the Vertical mode. When the signal is "1110", it is regarded as indicating the Pass mode, and "1" is outputted on a line p; when the signal is "1111", it is regarded as indicating the Horizontal mode, and "1" is provided on a line h; when the signal is "0", "100" or "1100", it is regarded as indicating that the direction of the distance $b_1 a_1$ is plus in the Vertical mode, and "1" is produced on a line V+; and when the signal is "101" or "1101", it is regarded as indicating that the direction of the distance $b_1 a_1$ is minus in the Vertical mode, and "1" is yielded on a line V-. The address control circuit 221 has such a construction as depicted in FIG. 5C, from which when any one of the outputs p, V- and V+ from the mode code identify circuit is "1", pulses provided from $Sa_0$ are applied to the memory 211 to shift it bit by bit from the $a_0$ address.

When the identify circuit 203 provides "1" on the line p, the address control circuit 221 shifts the reference line memory 211 from the address of the picture element $a_0$ to start detection of the picture elements $b_1$ and $b_2$. The reference line memory 211 has prestored therein information of the previous line via the decoded line memory 212. The change picture element detector 240 has the construction shown in FIG. 4B and provides an output "1" upon each detection of a picture element different from the immediately preceding one in the signal series applied from the line memory 211. At the moment when the change picture element detector 240 provides the output "1", if the detected picture element is different in level from the picture element $a_0$, the output "1" is applied via the exlusive OR circuit 293 to the $b_1$ detector (an AND circuit) 251 to produce an output "1" on a line $b_{1p}$. The $a_0 b_1$ counter 272 receives pulses from the address control circuit 221 and counts the number of pulses occurring in the time interval from the $a_0$ address to $b_1$ (until "1" is provided on the line $b_{1p}$). The $b_2$ detector 252 outputs "1" on a line $b_{2p}$ when another change picture element is detected by the change picture element detector 240 after detection of the picture element $b_2$ ("1" on the line $b_{1p}$). This $b_1$ detector comprises a flip-flop and an AND circuit. The $a_0 b_2$ counter 271 receives pulses from the address control circuit 221 and counts them occurring in the time interval from the $a_0$ address to $b_2$ (until "1" is provided on the line $b_{2p}$). Upon occurrence of "1" on the line $b_{2p}$, the address control circuit 221 once stops sending out of the shift pulses. The information of the $a_0 b_2$ counter 271 is applied to the $a_0$ register 300 via the gate 281, which is opened by the provision of the output "1" on the line p of the mode code identify circuit 203. The contents of the $a_0$ register 300 are added to the address control circuits 221 and 222, so that $a_0$ address is newly set and the decoding operation is resumed.

In a case where the identify circuit 203 provides "1" on the line V+ or V- (Vertical mode), the output "1" from the OR circuit 291 is applied to the address control circuit 221 and the $b_1 a_1$ decoder 231. As a consequence, decoding relating to the abovesaid $b_1$ and $b_2$ takes place, and the count value of the $a_0 b_1$ counter indicates the address of the picture element $b_1$ relative to the picture element $a_0$. The $b_1 a_1$ decoder 231 reads signals of one word from the input buffer memory 202 and decodes them. The decoded value is added by the adder 261 to the value of the $a_0 b_1$ counter 272 and, at the same time, subtracted by the subtractor 262 from the value of the $a_0 b_1$ counter 272. In a case where the output line V+ of the mode code identify circuit 203 is "1", the gate 284 is opened, so that the contents of the adder 261 is provided via the OR circuit 292 to the address control circuit 222 and to the $a_0$ register 300 via the gate 282. In contrast thereto, if the output line V- of the mode code identify circuit 203 is "1", the gate 285 is opened, passing the contents of the subtractor 262 to the address control circuit 222 via the OR circuit 292 and to the $a_0$ register 300 via the gate 282.

Figure 8B:
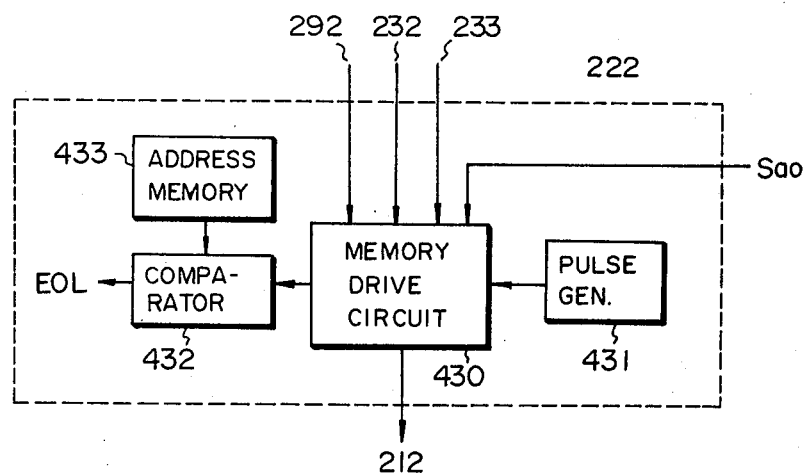
FIG. 8B is a block diagram illustrating a circuit example employed in FIG. 13.

The address control circuit 222 has such a construction as depicted in FIG. 8B, which sets up the address of the picture element $a_1$ on the basis of the contents transmitted thereto via the OR circuit 292, reproduces the picture element signals on the decoded line from the picture element $a_0$ to a picture element immediately preceding $a_1$ identical with the level of the picture element $a_0$ and inverts the level of the picture element $a_1$ relative to the level of the picture element $a_0$. The content of the $a_0$ register 300 is applied to the address control circuits 221 and 222, newly setting the address of the picture element $a_0$ and resuming decoding.

In a case where the line h of the mode code identify circuit 203 becomes "1" (Horizontal mode), the $a_0 a_1$ and $a_1 a_2$ decoders 232 and 233 successivley read signals of two words from the input buffer memory 202 and the $a_0a_1$ decoder 232 decodes the first one word and the $a_1a_2$ decoder 233 the second one word. The decoded values are added to the address control circuit 222 and to the $a_0$ register 300 via the gate 283 or 286. The address control circuit 222 sets up the addresses of the picture elements $a_1$ and $a_0$, reproduces the picture element signal on the decoded line from the picture element $a_0$ to a picture element immediately preceding $a_1$ to be the same level as that of the picture element $a_0$ and inverts the level of the picture element $a_1$ and, thereafter, reproduces the picture element signals from the picture element $a_1$ to a picture element immediately preceding $a_2$ to be the same level as that of the picture element $a_1$ and sets the level of the picture element $a_2$ to be different from the level of the picture element $a_1$. The $a_0$ address register 300 restores the addresses of the picture elements $a_1$ and $a_2$, so that the $a_2$ address becomes a new $a_0$ address. This new information is provided to the address control circuits 221 and 222 to set the $a_0$ address and restart decoding.

The two-dimensional decoded outputs of the Vertical and Horizontal modes thus applied to the address control circuit 222 is processed therein as described above and then stored in the decoded signal memory 342. In this case, since the flip-flop 322 is in the set state, the gate 332 is opened by its output, so that the two-dimensional decoded signal stored in the decoded signal memory 342 is applied to the decoded line memory 212 and then outputted via the output terminal 350.

Next, when the first control code detector 311 detects the control code indicating the one-dimensional coded signal, the gate 287 is opened, as mentioned above, and the signal of the line is decoded by the one-dimensional decoder 234, thereafter being stored in the decoded signal memory 341. At this time, since the gate 331 is open, the one-dimensional decoded signal is provided to the decoded line memory 212, thereafter being outputted via the output terminal 350.

Also in respect of the above decoding device, the resetting conditions for the detectors, the registers, the counters and so forth have been neither described nor shown in the drawings; but required ones of them (the mode code identify circuit 203, the $b_2$ detector 252, the address control circuits 221 and 222, the counters 271 and 272, the decoders 231, 232 and 233, etc.) are reset for each setting of the $a_0$ address. The termination of one line is achieved by supervising the $a_0$ address with the address control circuit 222 and, at the moment of the address of the picture element $a_0$ becoming the address of the last picture element of a scanning line, decoding of that line is completed and decoding of the next line is resumed.

In the embodiment described above, the numbers of bits of the one-dimensional and two-dimensional coded signals for each line are compared, and the coded signal of a smaller number of coded bits is selected; but this comparison between the amounts of information of the one-dimensional and two-dimensional coded signals is not limited specifically to the above. For example, the absolute number and a predetermined reference number of picture element changing points of the line to be coded are compared with each other; if the former is smaller than the latter, the one-dimensional coded line is used, and if the latter is smaller than the former, the two-dimensional coded line is used. Similarly, a difference between the absolute number of picture element changing points of the line to be coded and the absolute number of picture element changing points of an immediately preceding reference line is compared with a predetermined reference number; if the former is smaller than the latter, the two-dimensional coded line is used, and if the former is larger than the latter, the one-dimensional coded line is used.

In the above, the one-dimensional and two-dimensional coded lines are selectively employed in accordance with the results of comparison between the amounts of information of the one-dimensional and two-dimensional coded signals at the end of scanning of one line, but it is also possible to perform coding and comparison for each signal of a predetermined length on one scanning line. Moreover, while the above embodiment has been described in connection with a case of using the two-dimensional sequential coding system, the invention can be carried into practice even if some other two-dimensional coding system is used.

Figure 14:
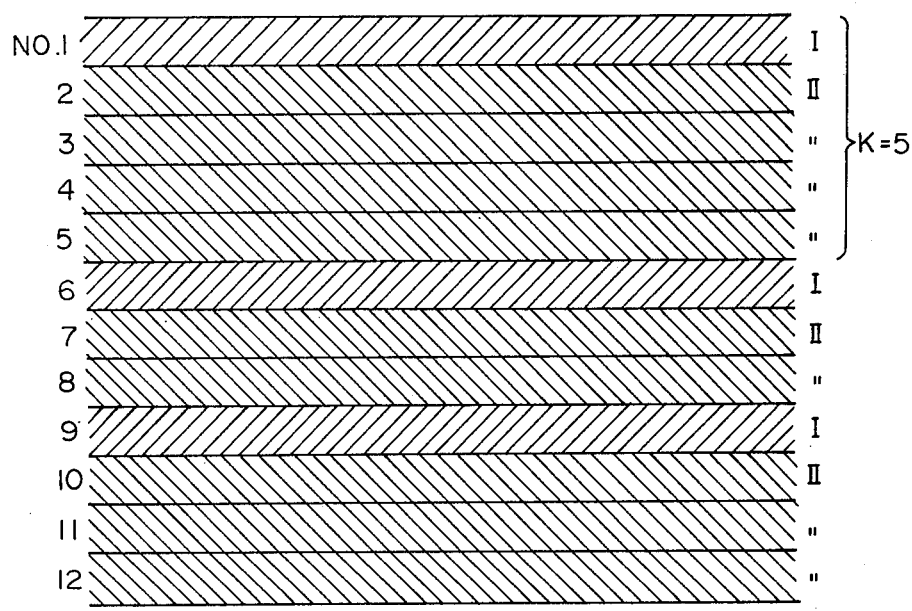

As described in the foregoing, according to this invention, a digital facsimile signal is coded by the one-dimensional and the two-dimensional coding system for each line and, in accordance with the amounts of information of the two coded signals, a more favorable one of them is selected as a coded output, for example, as shown in FIG. 14. Accordingly, there is the possibility that two-dimensional coded outputs are successively produced over a number of lines. With the two-dimensional coding system, however, each line is coded and decoded utilizing picture signal information of a reference line immediately preceding it, as described previously, and a code error resulting from a circuit noise or the like is likely to lead to a substantial degradation of the picture quality of reproduced picture in those lines following that in which the code error has occurred. Therefore, in a case where when a code error is detected, a request repeat system can be used as in a four-wire private circuit or data communication network and a two-wire network circuit like an ordinary telephone circuit is employed, it is necessary to prevent spreading of the error.

Next, a description will be given of a system for limiting degradation of the picture quality of a reproduced picture due to the code error. This is to prevent that in the one-dimensional, two-dimensional adaptive coding system described in the foregoing, the number of two-dimensional coded lines being outputted in succession exceeds, for example, K lines (K is selected suitably but is shown to be five.), as shown in FIG. 14.

In FIG. 14, in a case where it is judged that a one-dimensional coded line is favorable for a first line and that two-dimensional coded lines are favorable for second to eighth lines, a one-dimensional coded line is compulsorily used for the sixth line instead of the two-dimensional coded line so that K does not exceed five. In FIG. 14, for a ninth line, a one-dimensional coded output is produced according to the judgement that it is favorable for the line. Even if the one-dimensional coded line is selected as a result of comparison between the one-dimensional and two-dimensional coded lines, a one-dimensional coded line is thus compulsorily inserted after K-1 successive two-dimensional coded lines counting from the one-dimensional coded line. Accordingly, a one-dimensional coded line may in some cases be inserted after two-dimensional lines less than K are outputted.

Figure 15:
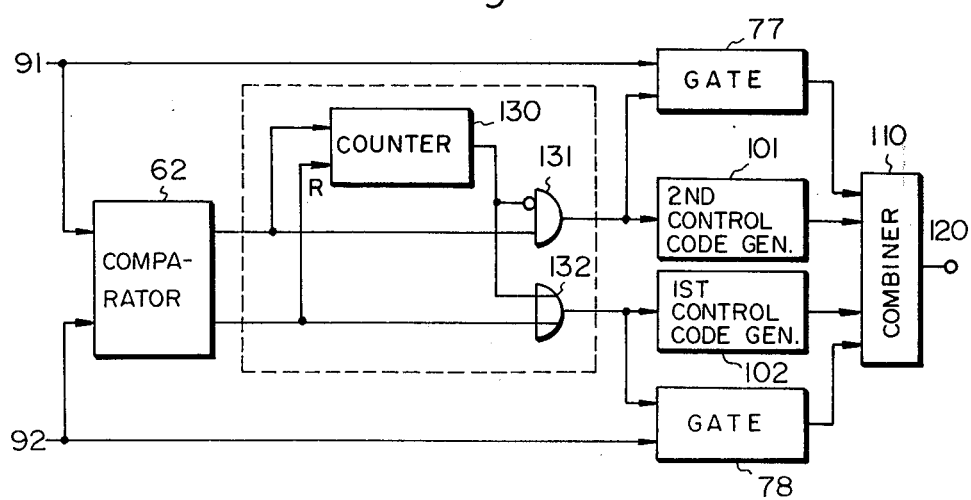

In an embodiment of this invention based on such principles, there are provided in the coding device a scale-of-K counter 130, an inhibit circuit 131 and OR circuit 132, as indicated by the broken line in FIG. 15.

When the output $S_2$ from the comparator 62 is produced successively for K lines, the output $S_2$ is inhibited by the inhibit circuit 131, and the output from the OR circuit 132 is applied to the first control code generator 102 and the gate 78, with the result that the first control code and a one-dimensional coded signal are transferred to the signal combiner 110. For the decoding device, however, no modification is needed.

As has been described in detail in the foregoing, the present invention permits a substantial reduction of the amount of information to be transmitted and prevents spreading of degraded picture quality due to a code error or the like.

What we claim is:

1. A coding method for a facsimile signal, in which a two-level facsimile signal obtained by scanning an original picture and successively sampling the scanning output into picture elements is received as an input, and in which the position of an information change picture element having changed from one to the other of two signal levels is coded and outputted, the improvement of the method comprising:

a first step of setting a starting picture element on a coding scanning line to be coded from which the coding starts;

a second step of detecting first and second information change picture elements successively following the starting picture element on the coding scanning line;

a third step of detecting a first reference picture element which is a first information change picture element lying after a picture element just above the starting picture element on a reference scanning line immediately preceding the coding scanning line and has a signal level different from that of the starting picture element and a second reference picture element next to the first information change picture element;

a fourth step of detecting, as a first mode, the state in which the second reference picture element is detected spaced apart from a picture element just above the first information change picture element by more than n (n being an integer) picture elements;

a fifth step of detecting, as not the first mode, the state in which the second reference picture element is not detected spaced apart from a picture element just above the first information change picture element by more than n picture elements;

a sixth step of comparing a first correlation between the starting picture element and the first information change picture element and between the first information change picture element and the second information change picture element with a second correlation between the first information change picture element and the first reference picture element and between the second information change picture element and the second reference picture element when the abovesaid state is detected as not the first mode;

a seventh step of coding the prsence of the first and second reference picture elements as the first mode and setting the picture element just below the second reference picture element as the starting picture element in the first step when the first mode is detected;

an eighth step of coding a distance between the starting picture element and the first information change picture element and a distance betweenn the first information change picture element and the second information change picture element as a second mode and setting the second information change picture element as the starting picture element in the first step when the first correlation is higher than the second correlation;

a ninth step of coding a distance between the first information change picture element and the first reference picture element and a distance between the second information change picture element and the second reference picture element is a third mode and setting the second information change picture element as the starting picture element in the first step when the first correlation is lower than the second correlation; and a tenth step of sending out the coded outputs of the seventh, eighth and ninth steps after combining them into a composite signal.

2. A coding method for a facsimile signal according to claim 1, further comprising:

an eleventh step of successively coding by a one-dimensional method information change picture elements on a coding scanning line to be coded for each predetermined length of the coding scanning line to develop one dimensional codes and storing the one-dimensional codes;

a twelfth step of comparing the information amount of the one-dimensional codes with the two-dimensional codes stored for each predetermined length of the coding scanning line;

a thirteenth step of selecting said composite signal as an output when the information amount of the one-dimensional codes is higher than the information amount of the two-dimensional codes;

a fourteenth step of selecting the one-dimensional codes as an output when the information amount of the one-dimensional codes is not higher than the information amount of the two-dimensional codes; and a fifteenth step of adding a peculiar control code to the coded output of each of the thirteenth and fourteenth steps for sending out them after combining into a composite transmission signal.

3. A coding method for a facsimile signal, in which a two-level facsimile signal obtained by scanning an original picture and successively sampling the scanning output into picture elements is received as an input, and in which the position of an information change picture element having changed from one to the other of two signal levels is coded and outputted, the improvement of the method comprising:

a first step of setting a starting picture element on a coding scanning line to be coded from which the coding starts;

a second step of detecting first and second information change picture elements successively following the starting picture element on the coding scanning line;

a third step of detecting a first reference picture element which is a first information change picture element lying after a picture element just above the starting picture element on a reference scanning line immediately preceding the coding scanning line and has a signal level different from that of the starting picture element and a second reference picture element next to the first information change picture element;

a fourth step of detecting, as a first mode, the state in which the second reference picture element is detected spaced apart from a picture element just above the first information change picture element by more than n (n being an integer) picture elements;

a fifth step of detecting, as not the first mode, the state in which the second reference picture element is not detected spaced apart from a picture element just above the first information change picture by element more than n picture elements;

a sixth step of comparing a first correlation between the starting picture element and the first information change picture element and between the first information change picture element and the second information change picture element with a second correlation between the first information change picture element and the first reference picture element and between the second information change picture element and the second reference picture element when the abovesaid state is detected as not the first mode;

a seventh step of coding the presence of the first and second reference picture elements as the first mode and setting the picture element just below the second reference picture element as the starting picture element in the first step when the first mode is detected;

an eighth step of coding the distance between the starting picture element and the first information change picture element and a distance between the first information change picture element and the second information change picture element as a second mode and setting the second information change picture element as the starting picture element in the first step when the first correlation is higher than the second correlation;

a ninth step of coding a distance between the first information change picture element and the first reference picture element and a distance between the second information change picture element and the second reference picture element as a third mode and setting the second information change picture element as the starting picture element in the first step when the first correlation is lower than the second correlation; and a tenth step of temporarily stopping the two-dimensional coding operation and coding the positions of information change picture elements of the next coding scanning line only without referring to the positions of information change picture elements of another scanning line when the number of coding scanning lines has reached a preset value; and an eleventh step of sending out the coded outputs of the seventh, eighth, ninth and tenth steps after combining them into a composite signal.

4. A coding method for a facsimile signal according to claim 3, further comprising:
- a twelfth step of successively coding by a one-dimensional method information change picture elements on a coding scanning line to be coded for each predetermined length of the coding scanning line to develop one-dimensional codes and storing the one-dimensional codes;
- a thirteenth step of comparing the information amount of the one-dimensional codes with the two-dimensional codes stored for each predetermined length of the coding scanning line;
- a fourteenth step of selecting said composite signal as an output when the information amount of the one-dimensional codes is higher than the information amount of the two-dimensional codes;
- a fifteenth step of selecting the one-dimensional codes as an output when the information amount of the one-dimensional codes is not higher than the information amount of the two-dimensional codes; and
- a sixteenth step of adding a peculiar control code to the coded output of each of the fourteenth and fifteenth steps for sending out them after combining into a composite transmission signal.

5. A coding method for a facsimile signal, in which a two-level facsimile signal obtained by scanning an original picture and successively sampling the scanning output into picture elements is received as an input, and in which the position of an information change picture element having changed from one to the other of two signal levels is coded and outputted, the improvement of the method comprising:

a first step of setting a starting picture element on a coding scanning line to be coded from which the coding starts;

a second step of detecting first and second information change picture elements successively following the starting picture element on the coding scanning line;

a third step of detecting a first reference picture element which is a first information change picture element lying after a picture element just above the starting picture element on a reference scanning line immediately preceding the coding scanning line and has a signal level different from that of the starting picture element and a second reference picture element next to the first information change picture element;

a fourth step of detecting, as a first mode, the state in which the second reference picture element is detected spaced apart from a picture element just above the first information change picture element by more than n (n being an integer) picture elements;

a fifth step of detecting, as not the first mode, the state in which the second reference picture element is not detected spaced apart from a picture element just above the first information change picture element by more than n picture elements;

a sixth step of comparing a first correlation between the starting picture element and the first information change picture element with a second correlation between the first information change picture element and the first reference picture element when the abovesaid state is detected as not the first mode;

a seventh step of coding the presence of the first and second reference picture elements as the first mode and setting the picture element just below the second reference picture element as the starting picture element in the first step when the first mode is detected;

an eighth step of coding a distance between the first information change picture element and the first reference picture element as a third mode and setting the first information change picture element as the starting picture element in the first step when the first correlation is lower than the second correlation;

a ninth step of newly comparing a third correlation between the starting picture element and the first information change picture element and the between the first information change picture element and the second information change picture element with a fourth correlation between the first information change picture element and the first reference picture element and between the second information change picture element and the second reference picture element when it is detected that the first correlation is higher than the second correlation;

a tenth step of coding a distance between the starting picture element and the first infformation change picture element and a distance between the first information change picture element and the second information change picture element as a second mode and setting the second information change picture element as the starting picture element in the first step when the third correlation is higher than the fourth correlation;

an eleventh step of coding a distance between the first information change picture element and the first reference picture element and a distance between the second information change picture element and the second reference picture element as a third mode and setting the second information change picture element as the starting picture element in the first step when the third correlation is lower than the fourth correlation; and a twelfth step of sending out the coded outputs of the seventh, eighth, tenth and eleventh steps after combining them into a composite signal.

6. A coding method for a facsimile signal according to claim 5, further comprising:

a thirteenth step of successively coding by a one-dimensional method information change picture elements on a coding scanning line to be coded for each predetermined length of the coding scanning line to develop one-dimensional codes and storing the one-dimensional codes;

a fourteenth step of comparing the information amount of the one-dimensional codes with the two-dimensional codes stored for each predetermined length of the coding scanning line; a fifteenth step of selecting said composite signal as an output when the information amount of the one-dimensional codes is higher than the information amount of the two-dimensional codes;

a sixteenth step of selecting the one-dimensional codes as an output when the information amount of the one-dimensional codes is not higher than the information amount of the two-dimensional codes; and a seventeenth step of adding a peculiar control code to the coded output of each of the fifteenth and sixteenth steps for sending out them after combining into a composite transmission signal.

7. A coding method for a facsimile signal, in which a two-level facsimile signal obtained by scanning an original picture and successively sampling the scanning output into picture elements is received as an input, and in which the position of an information change picture element having changed from one to the other of two signal levels is coded and outputted, the improvement of the method comprising:

a first step of setting a starting picture element on a coding scanning line to be coded from which the coding starts;

a second step of detecting first and second information change picture elements successively following the starting picture element on the coding scanning line;

a third step of detecting a first reference picture element which is a first information change picture element lying after a picture element just above the starting picture element on a reference scanning line immediately preceding the coding scanning line and has a signal level different from that of the starting picture element and a second reference picture element next to the first information change picture element;

a fourth step of detecting, as a first mode, the state in which the second reference picture element is detected spaced apart from a picture element just above the first information change picture element by more than n (n being an integer) picture elements;

a fifth step of detecting, as not the first mode, the state in which the second reference picture element is not detected spaced apart from a picture element just above the first information change picture element by more than n picture elements;

a sixth step of comparing a first correlation between the starting picture element and the first information change picture element with a second correlation between the first information change picture element and the first reference picture element when the abovesaid state is detected as not the first mode;

a seventh step of coding the presence of the first and second reference picture elements as the first mode and setting the picture element just below the second reference picture element as the starting picture element in the first step when the first mode is detected;

an eighth step of coding the distance between the first information change picture element and the first reference picture element as a third mode and setting the first information change picture element as the starting picture element in the first step when the first correlation is lower than the second correlation;

a ninth step of newly comparing a third correlation between the starting picture element and the first information change picture element and between the first information change picture element and the second information change picture element with a fourth correlation between the first information change picture element and the first reference picture element and between the second information change picture element and the second reference picture element when it is detected that the first correlation is higher than the second correlation;

a tenth step of coding a distance between the starting picture element and the first information change picture element and a distance between the first information change picture element and the second information change picture element as a second mode and setting the second information change picture element as the starting picture element in the first step when the third correlation is higher than the fourth correlation;

an eleventh step of coding a distance between the first information change picture element and the first reference picture element and a distance between the second information change picture element and the second reference picture element as a third mode and setting the second information change picture element as the starting picture element in the first steps when the third correlation is lower than the fourth correlation;

a twelfth step of temporarily stopping the two-dimensional coding operation and coding the positions of information change picture elements of the next coding scanning line only without referring to the positions of information change picture elements of another scanning line when the number of coding scanning lines has reached a preset value; and a thirteenth step of sending out the coded outputs of the seventh, eighth, tenth, eleventh and twelfth steps after combining them into a composite signal.

8. A coding method for a facsimile signal according to claim 7, further comprising:

a fifteenth step of successively coding by a one-dimensional method information change picture elements on a coding scanning line to be coded for each predetermined length of the coding scanning line to develop one-dimensional codes and storing the one-dimensional codes;

a sixteenth step of comparing the information amount of the one-dimensional codes with the two-dimensional codes stored for each predetermined length of the coding scanning line;

a seventeenth step of selecting said composite signal as an output when the information amount of the one-dimensional codes is higher than the information amount of the two-dimensional codes;

an eighteenth step of selecting the one-dimensional codes as an output when the information amount of the one-dimensional codes is not higher than the information amount of the two-dimensional codes; and a nineteenth step of adding a peculiar control code to the coded output of each of the seventeenth and eighteenth steps for sending out them after combining into a composite transmission signal.

* * * * *